(12) United States Patent
Boutakis

(10) Patent No.: US 10,040,504 B2
(45) Date of Patent: Aug. 7, 2018

(54) COMPACTABLE BICYCLE

(71) Applicant: Peter Boutakis, North York (CA)

(72) Inventor: Peter Boutakis, North York (CA)

( * ) Notice: Subject to any disclaimer, the term of this patent is extended or adjusted under 35 U.S.C. 154(b) by 37 days.

(21) Appl. No.: 15/178,200

(22) Filed: Jun. 9, 2016

(65) Prior Publication Data
US 2016/0288857 A1    Oct. 6, 2016

Related U.S. Application Data

(63) Continuation-in-part of application No. PCT/CA2015/050584, filed on Jun. 23, 2015.

(60) Provisional application No. 62/016,021, filed on Jun. 23, 2014.

(51) Int. Cl.
*B62K 15/00* (2006.01)
*B62K 21/18* (2006.01)
*B62K 25/00* (2006.01)
*B62K 3/02* (2006.01)

(52) U.S. Cl.
CPC ............. *B62K 15/00* (2013.01); *B62K 3/02* (2013.01); *B62K 15/008* (2013.01); *B62K 21/18* (2013.01); *B62K 25/005* (2013.01); *B62K 2015/005* (2013.01)

(58) Field of Classification Search
CPC ........ B62K 3/02; B62K 15/00; B62K 15/008; B62K 21/18; B62K 25/005; B62K 2015/005
USPC ........................................................ 280/278
See application file for complete search history.

(56) References Cited

U.S. PATENT DOCUMENTS

| 7,584,978 | B2 | 9/2009 | Pourias | |
|---|---|---|---|---|
| 2012/0024102 | A1* | 2/2012 | Marion | B62K 15/00 74/493 |

FOREIGN PATENT DOCUMENTS

| DE | 1906014 A1 | 8/1969 |
|---|---|---|
| GB | 274181 A | 7/1927 |
| JP | 3108848 U | 4/2005 |

OTHER PUBLICATIONS

PCT/CA2015/050584, International Search Report & Written Opinion, dated Oct. 5, 2015.

* cited by examiner

*Primary Examiner* — Joseph M Rocca
*Assistant Examiner* — Felicia L. Brittman
(74) *Attorney, Agent, or Firm* — Millman IP Inc.

(57) ABSTRACT

In an aspect, a compactable bicycle is provided, comprising a base frame portion and a steering structure. The base frame portion includes a seat tube and a head tube, a connecting tube connecting them and a rear frame portion that has a rear wheel mounted thereto. The steering structure includes a steering member rotatably mounted in the head tube, a handlebar, and a front wheel support having a front wheel connected thereto. The steering member includes first and second portions that are removably connectable together. The head tube includes first and second portions that hold the first and second steering member portions respectively. The second head tube portion is movable relative between a first position in which the first steering member portion is superjacent to the second steering member portion, and a second, stowage position.

7 Claims, 31 Drawing Sheets

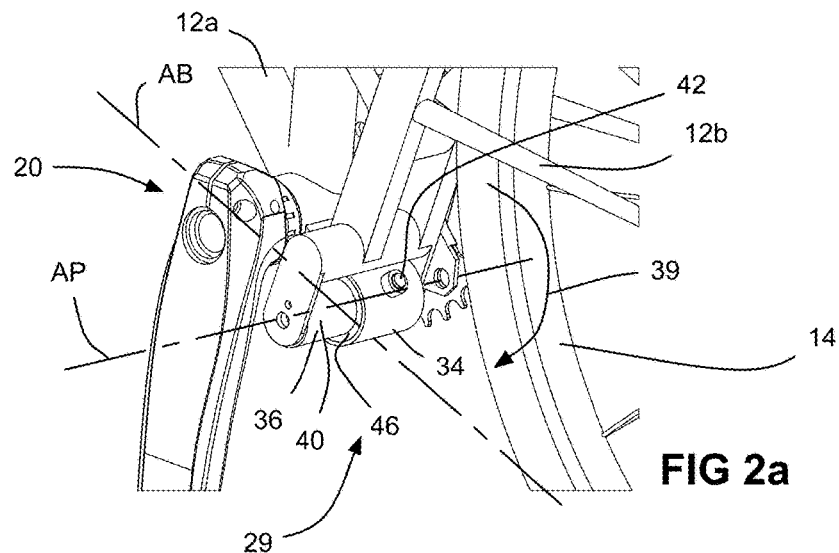
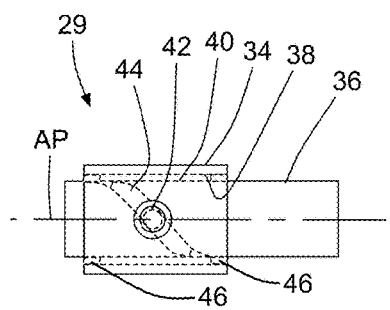
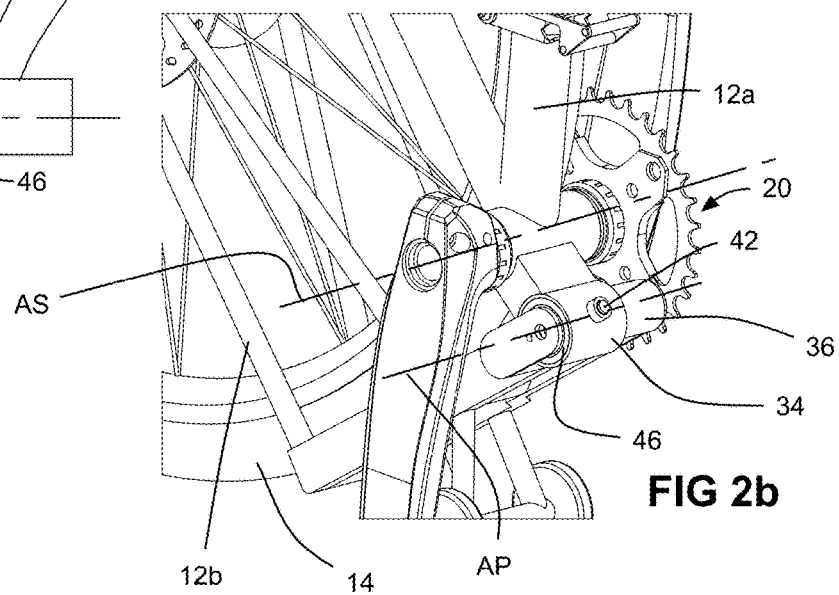

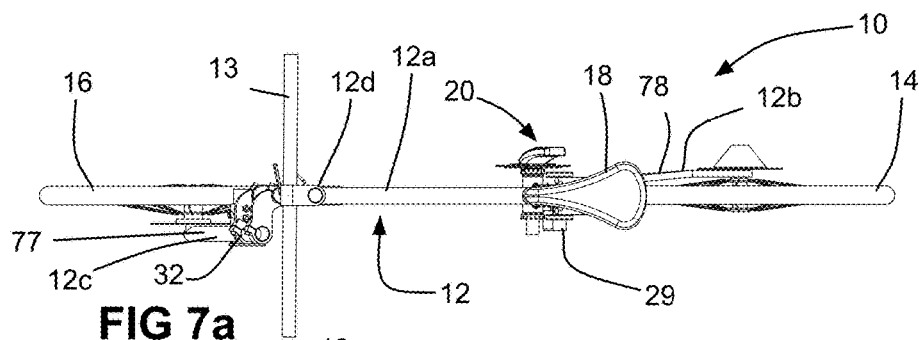
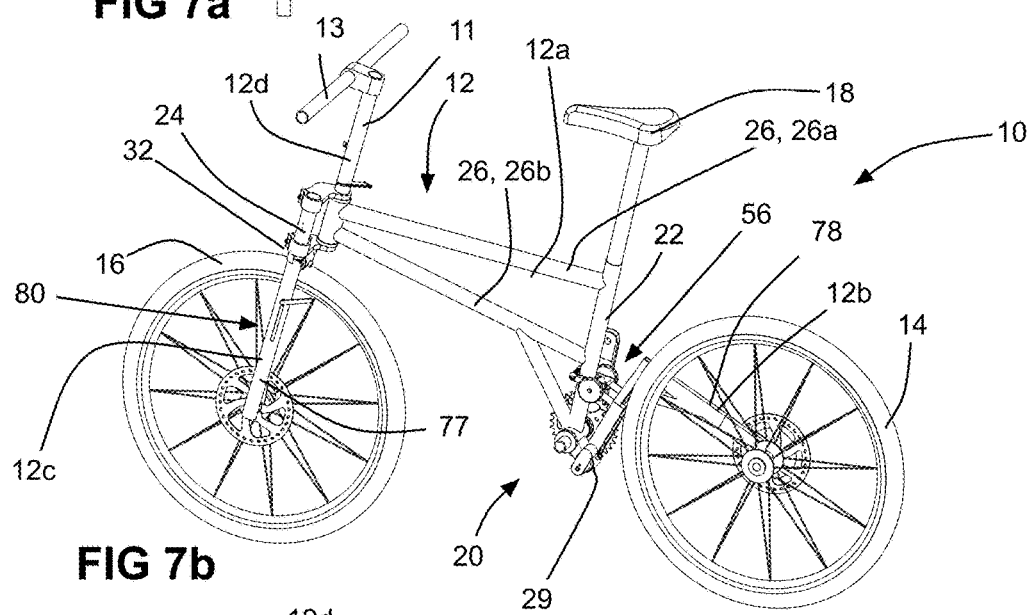
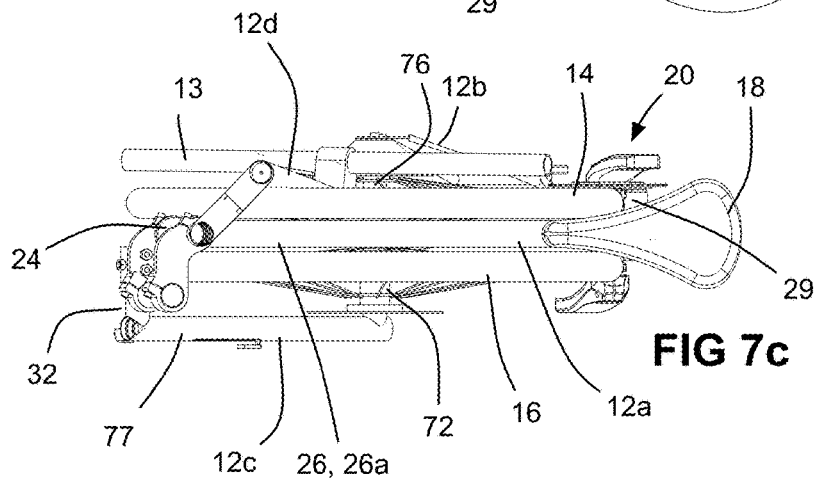

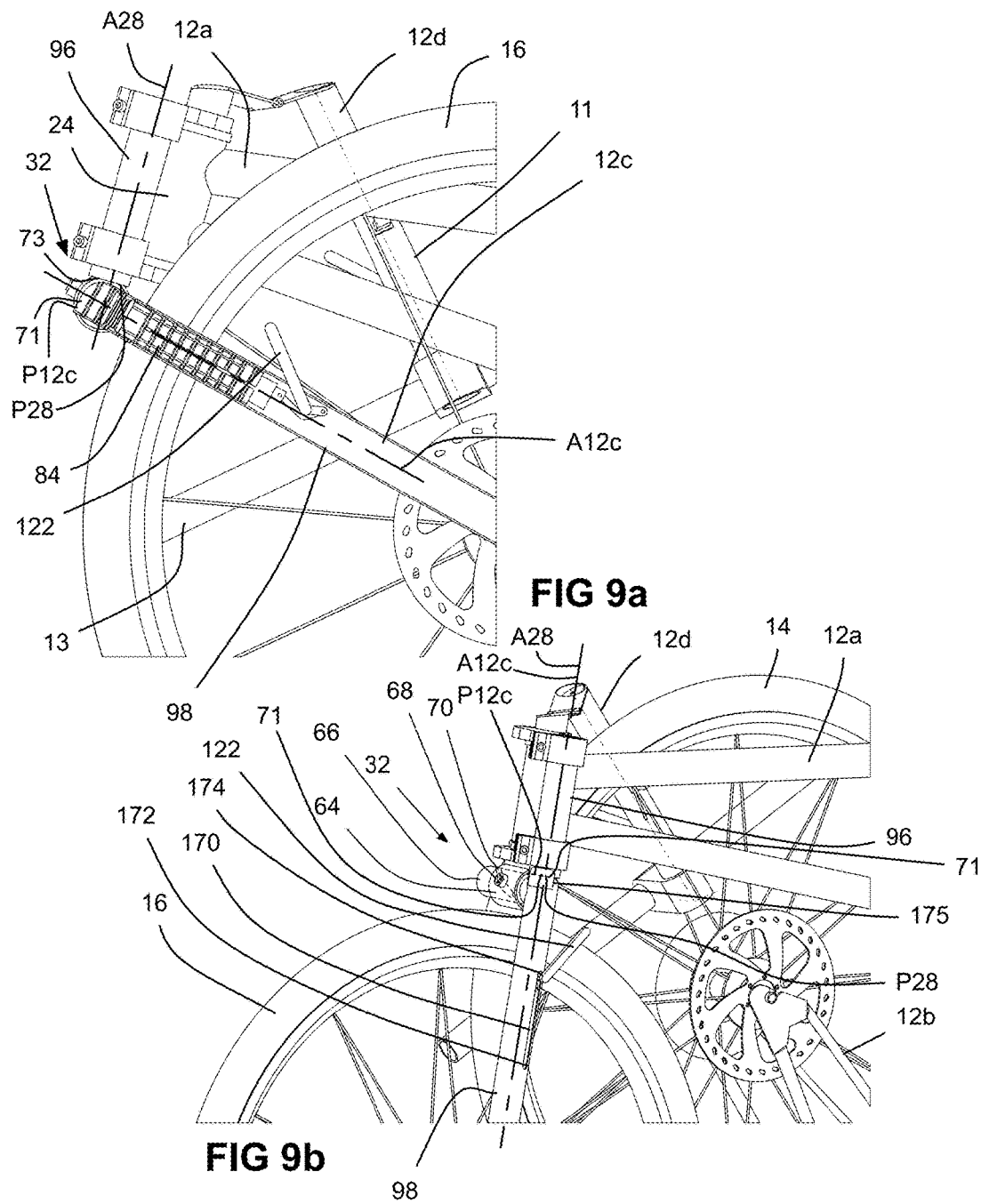

COMPACTABLE BICYCLE

CROSS-REFERENCE TO RELATED APPLICATIONS

This application claims the benefit of priority to (and is a continuation in part of) U.S. PCT/CA2015/050584, filed on Jun. 23, 2015, which claims priority from U.S. Provisional Patent Application No. 62/016,021 filed Jun. 23, 2014, the contents of which are incorporated herein in their entirety.

FIELD

The present disclosure relates to bicycles that can be compacted for storage and more particularly to folding bicycles.

BACKGROUND

There are many designs for folding bicycles. Typically such designs are relatively weak structurally rendering the bicycle frame at risk of premature failure. Additionally such designs are typically inefficient in that they do not fold into a relatively compact shape.

There is consequently a need for a folding bicycle that addresses at least one of these and/or other shortcomings in existing folding bicycle designs.

SUMMARY

This section provides a general summary of the disclosure, and is not a comprehensive disclosure of its full scope or all of its features.

In one aspect, a compactable bicycle is provided, which includes a frame, a locking mechanism, and first and second wheels. The frame includes a first frame portion and a second frame portion. The first frame portion includes a first tube having an inner surface and the second frame portion includes a second tube having an inner surface. The first and second frame portions are arrangeable together in a use position in which the first and second tubes are aligned with one another. The locking mechanism includes a base member, an expandable member mounted to the base member, and a driver that is movable to releasably drive expansion of the expandable member against the inner surfaces of the first and second tubes to releasably lock the first and second frame portions together in the use position. The first and second bicycle wheels are mounted to the frame.

In another aspect, a compactable bicycle having a length, a height and a width, is provided. The bicycle includes a base frame portion and a steering structure. The base frame portion includes a seat tube and a head tube, and at least one connecting tube that connects the seat tube and the head tube, and a rear frame portion that has a rear wheel mounted thereto for engagement with a ground surface for supporting the compactable bicycle thereon. The steering structure includes a steering tube rotatably mounted in the head tube, a handlebar frame portion connected to the steering tube, and a front wheel support having a front wheel connected thereto. The front wheel support has a front wheel support connecting end axis and a first end face that extends in a first end face plane that is generally normal to the first end face axis. The steering tube has a steering tube connecting end axis and a second end face that extends in a second end face plane that is generally normal to the steering tube connecting end axis. The front wheel support is movable between a use position in which the front wheel support connecting end axis is aligned with the steering tube connecting end axis, in which the first and second end faces abut one another, and in which the front wheel is engageable with a ground surface for supporting the compactable bicycle thereon, and a storage position in which the front wheel support connecting end axis is unaligned with the steering tube connecting end axis, in which the first and second end faces are spaced from one another.

In another aspect, a compactable bicycle is provided and includes a first frame portion and a first pivot connection. The first frame portion defines a longitudinal frame axis, a lateral frame axis and a vertical frame axis, a second frame portion, and a third frame portion. Each of the second and third frame portions has a bicycle wheel associated therewith such that the second frame portion has a rear wheel connected thereto and the third frame portion has a front wheel connected thereto. The first pivot connection includes a first outer member that is tubular and has a first outer member axis that extends generally laterally relative to the longitudinal frame axis, and a first inner member that is pivotably connected to the outer member for pivoting movement within the outer member about the outer member axis, and that is slidable laterally relative to the first outer member. One of the first inner and first outer members is connected to the first frame portion and the other of the first inner and first outer members is connected to one of the second and third frame portions. The aforementioned one of the second and third frame portions is positionable via the first pivot connection in a use position in which the wheel associated with said one of the second and third frame portions is orientable to be coplanar with the first frame portion and to be engageable with a ground surface to support the compactable bicycle thereon, and in a folded position in which the wheel associated with said one of the second and third frame portions is laterally adjacent to the first frame portion.

In another aspect, a compactable bicycle is provided and includes a main frame portion and an axle. The main frame portion includes a seat tube and a head tube, and at least one connecting tube that connects the seat tube and the head tube. The rear frame portion is movably mounted to the main frame portion and has a rear wheel mounted thereto. The rear frame portion is movable between a use position in which the rear wheel is engageable with a ground surface to support the compactable bicycle thereon, and a folded position. The axle is supported on the rear frame portion, and at least one folded position support wheel supported on the axle. When the rear frame portion is in the use position, the at least one folded position support wheel is supported off the ground surface, and when the rear frame portion is in the folded position, the at least one folded position support wheel is engageable with the ground surface to support the compactable bicycle thereon. In an embodiment, a hook member is provided on the main frame portion and is pivotable between an engagement position in which the hook member is positioned to engage the axle to retain the rear frame portion in the use position, and a release position in which the hook member is positioned to permit movement of the rear frame portion away from the use position. Optionally, a hook member biasing member is provided and is positioned to urge the hook member towards the engagement position.

In another aspect, a compactable bicycle is provided and includes a base frame portion and a steering structure. The base frame portion includes a seat tube and a head tube, at least one connecting tube that connects the seat tube and the head tube, and a rear frame portion that has a rear wheel mounted thereto for engagement with a ground surface for supporting the compactable bicycle thereon. The steering structure includes a steering member rotatably mounted in the head tube, a handlebar, and a front wheel support having a front wheel connected thereto for engagement with the ground surface for supporting the compactable bicycle thereon. The steering member includes a first steering member portion and a second steering member portion that are removably connectable together. The first steering member portion has the handlebar connected thereto and the second steering member portion has the front wheel support connected thereto. The head tube includes a first head tube portion that holds the first steering member portion, and a second head tube portion that holds the second steering member portion. The second head tube portion is movable relative to the first head tube portion between a first head tube position in which the second head tube portion carries the first steering member portion to a use position which is superjacent to the second steering member portion, and a second head tube position in which the second head tube portion is in a stowage position and holds the second steering member portion in a stowage position spaced away from the first steering member portion. When the first steering member portion is in the use position the first steering member portion is connectable to the second steering member portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 2a and 2b are perspective views of a portion of the folding bicycle shown in FIG. 1a, illustrating the folding of a rear frame portion of the folding bicycle;

FIG. 2c is a magnified elevation view of a pivot connection shown in FIGS. 2a and 2b;

FIGS. 5 and 6 are perspective views that illustration the operation of a locking mechanism for the rear frame portion of the folding bicycle shown in FIG. 1a;

FIGS. 7a and 7b are a top plan view and a perspective view respectively of a variant of the folding bicycle shown in FIG. 1a, which includes a rear frame portion that supports a rear wheel from one side only;

FIG. 7c is a top plan view of the variant of the folding bicycle shown in FIGS. 7a and 7b, in the folded position;

FIG. 8a is an elevation view of a locking mechanism that can be used to hold two frame portions together on the folding bicycle shown in FIG. 1a;

FIG. 9a is a side elevation view, partially in section, of a portion of the folding bicycle shown in FIG. 1a, showing the locking mechanism of FIG. 8a in a frame portion that is in a folded position;

FIG. 9b is a perspective view of the portion of the folding bicycle shown in FIG. 9a showing the locking mechanism of FIG. 8a in the frame portion when in a use position;

DETAILED DESCRIPTION

Figure 1A:
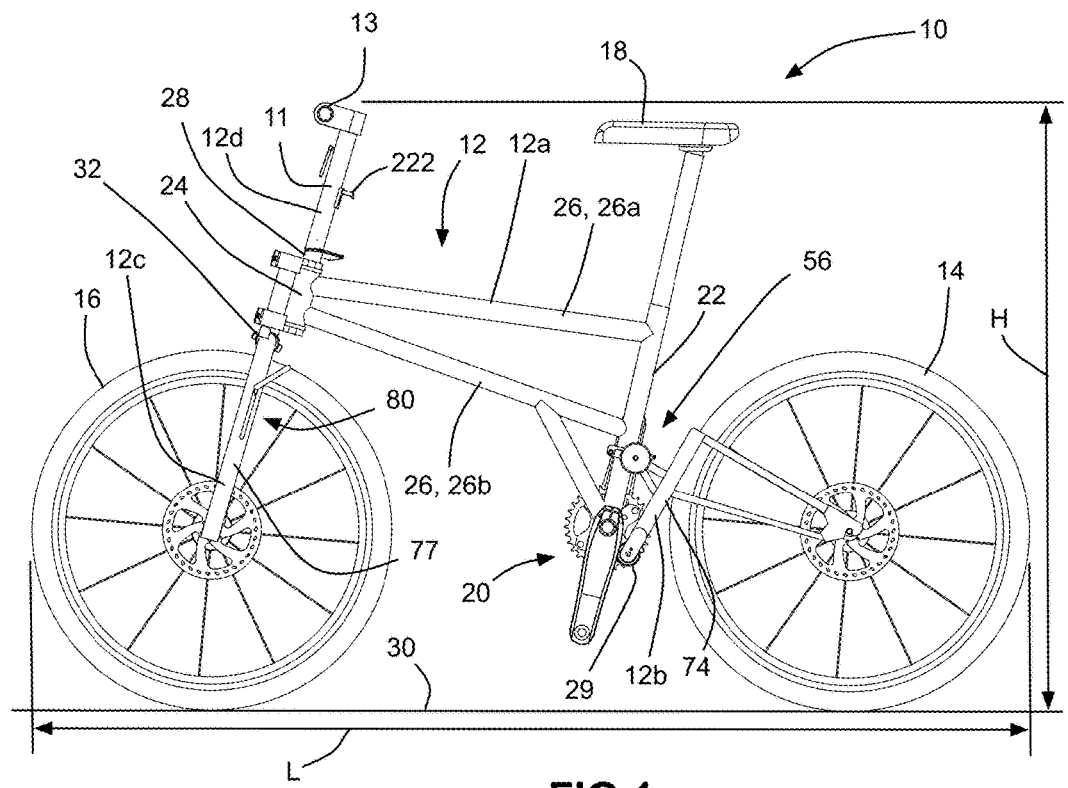
FIG. 1a is an elevation view of a compactable (e.g. folding) bicycle in accordance with the teachings of the present disclosure, in a use position.
Figure 1B:
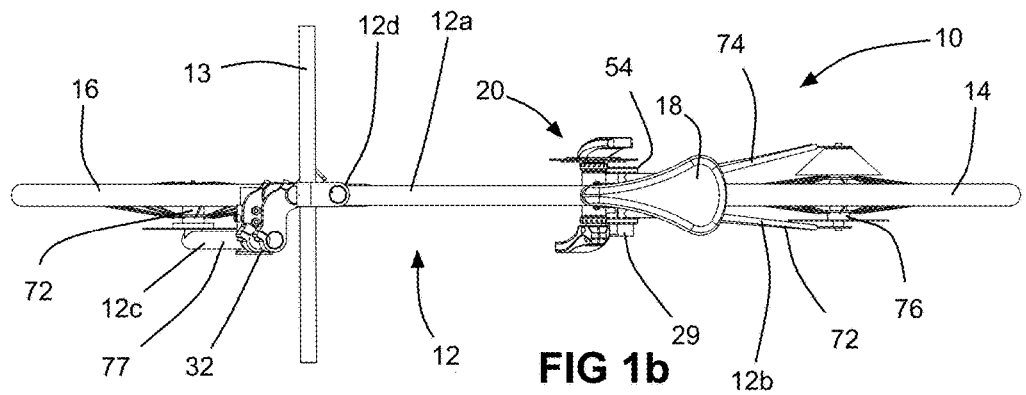
FIG. 1b is a top plan view of the folding bicycle shown in FIG. 1a, in the use position.

Reference is made to FIGS. 1a and 1b, which show a compactable bicycle 10 in accordance with an embodiment of the present disclosure. The folding bicycle 10 is movable between a use position shown in FIGS. 1a and 1b, and a storage position (which in the example shown may also be referred to as a folded position) shown in FIGS. 1f and 1g. The bicycle 10 in the embodiment shown in FIGS. 1a and 1b is compactable by a folding mechanism for selected components of the bicycle 10. However, it will be noted that, in some other embodiments, the bicycle 10 may be compactable by way of other types of mechanism aside from folding mechanisms, an example of which is described below in relation to FIGS. 19-23. For convenience, the bicycle 10 is referred to in some embodiments as a folding bicycle (in embodiments in which a folding mechanism is shown), however, it will be understood that the bicycle 10 may be more broadly referred to as compactable, and the folding mechanisms shown in the figures included herewith may be replaced in some embodiments by any other suitable types of mechanism for compacting the bicycle for the purposes of storage.

The folding bicycle 10 includes a frame 12, a rear wheel 14, a front wheel 16, a seat 18, and a drive component set generally shown at 20. The drive component set 20 includes components such as a crankset with at least one crankset sprocket, at least one rear wheel sprocket on the rear wheel 14, a chain connecting the crankset sprocket and rear wheel sprocket, and pedals that connect to the crankset. The drive component set 20 is envisioned to be included in the folding bicycle 10 typically, however it is possible to provide a version of the folding bicycle 10 that does not have a drive component set (e.g. a running bicycle).

The frame 12 comprises a main frame portion 12a, a rear frame portion 12b, a front wheel support 12c and a handlebar frame portion 12d that includes a handlebar support 11 to which a handlebar 13 is mounted. These frame portions 12a-12d may also be referred to as first, second, third and fourth frame portions 12a, 12b, 12c and 12d. For greater certainty, it will be understood, that any one of these frame portions 12a-12d may be considered the 'first' frame portion, any one may be considered the second, any one may be considered the third and any one may be considered the fourth. Different frame portions may be considered first, second, third or fourth in different contexts herein. Any limitations in this regard will be described below.

The main frame portion 12a may include a seat tube 22, a head tube 24, at least one connecting tube 26 and a steering tube 28. In the example shown there are two connecting tubes (a top tube 26a and a down tube 26b) that connect the seat tube 22 and the head tube 24, however any other suitable number of connecting tubes 26 may be provided. The connecting tubes 26 in the example shown permanently connect the seat tube 22 and head tube 24 (e.g. by welded connections to both or by a forming process where all of the tubes 22, 24 and 26 are formed together all at once). A permanent connection is preferred as it provides a main frame portion that is relatively strong, in particular where a main triangle is formed that extends all the way from the head tube 24 to the seat tube 22 as is shown in the figures. However, it is possible to provide a main frame portion that includes a main triangle that does not extend all the way between the seat tube 22 and the head tube 24 (e.g. where there is a down tube that extends from the seat tube 22 to a point midway along the length of the top tube), or that does not include a main triangle at all (e.g. where there is only a top tube that connects the seat tube 22 and head tube 24). Additionally, it is possible in some embodiments (although less preferable in some instances) to provide a main frame portion that is itself divided into two or more portions that are connected together via hinges or the like. The main frame portion 12a has a first side 25 and a second side 27, which are described further below with reference to the folding of the folding bicycle 10.

The steering tube 28 is pivotably mounted in the head tube 24. The steering tube 28 has both the front wheel support 12c and the handlebar frame portion 12d connected to it. Together the steering tube 28, the front wheel support 12c and the handlebar frame portion 12d make up a steering structure, while the head tube 24, the seat tube 22, the connecting tubes 26 and the rear frame portion 12b make up a base frame portion to which the steering structure is pivotally mounted.

Figure 1C:
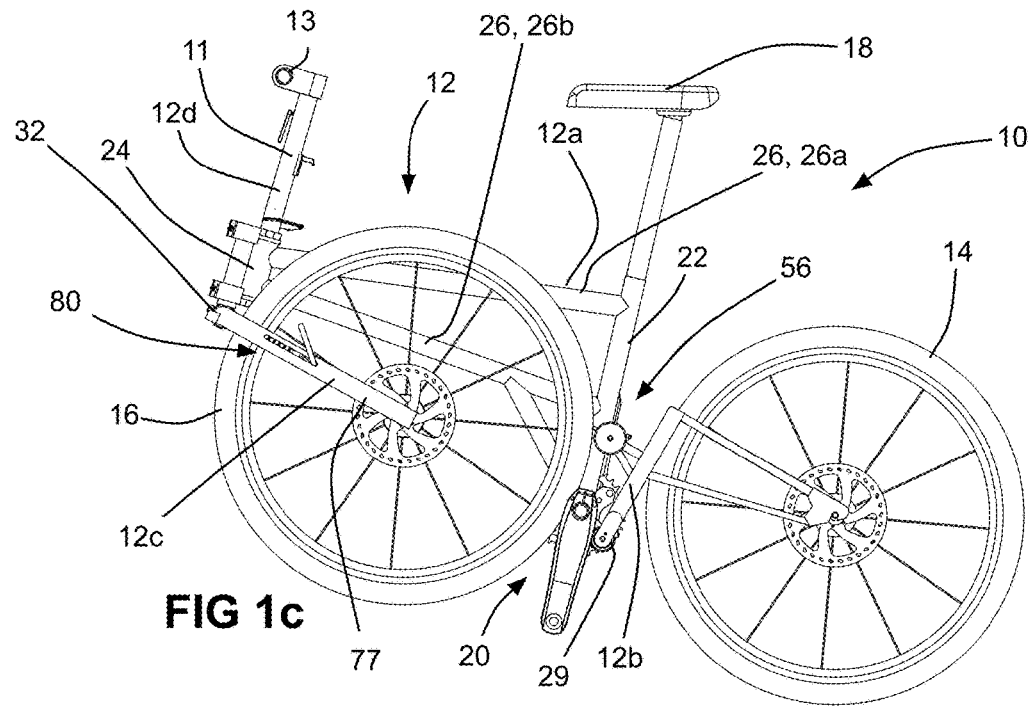
FIG. 1c is an elevation view of the folding bicycle shown in FIG. 1a in a partially folded position.
Figure 1D:
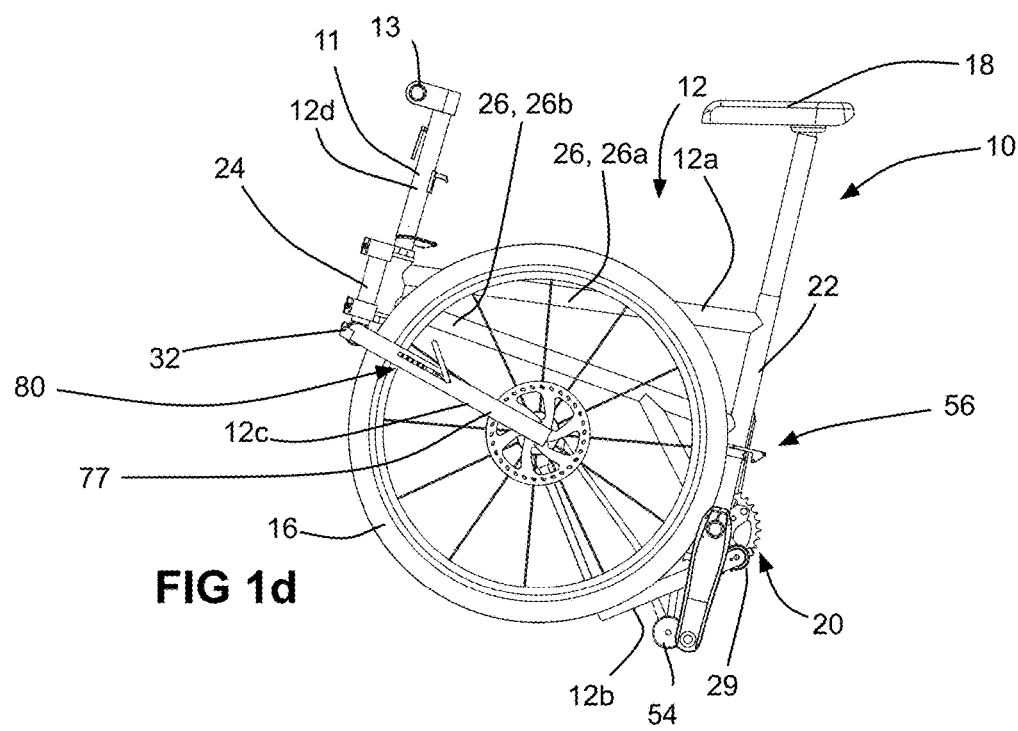
FIG. 1d is an elevation view of the folding bicycle shown in FIG. 1a in a further folded position.

The rear frame portion 12b has the rear wheel 14 connected thereto, and is movably connected to the main frame portion by a pivot connection 29, and is movable via the pivot connection 29 between a use position shown in FIG. 1a, and a folded position shown in FIGS. 1c and 1d. When the rear frame portion 12b is in the use position, the rear wheel 14 is engageable with a ground surface (shown at 30 in FIG. 1a) for supporting the folding bicycle 10 thereon. When the rear frame portion 12b is in the folded position, at least one of the length (shown at L) and the height (shown at H) is reduced relative to when rear frame portion 12b is in the use position.

The pivot connection 29 is shown more clearly in FIGS. 2a-2c and may be referred to as a first pivot connection 29, since there is another pivot connection shown at 32 that connects the front wheel support 12c to the main frame portion 12a. As can be seen, the first pivot connection 29 includes a first outer member 34 that is tubular and has a first outer member axis AP that extends generally laterally relative to the longitudinal bicycle frame axis, shown at AB. The pivot connection 29 further includes a first inner member 36 that is pivotably connected to the outer member 34 for pivoting movement within the outer member 34 about the outer member axis AP, and that is slidable laterally relative to the outer member 34. One of the first outer and first inner members 34 and 36 is connected to the main frame portion 12a and the other of the first inner and first outer members 34 and 36 is connected to the rear frame portion 12b. In the embodiment shown, the outer member 34 is connected to the frame member 12a and the inner member 36 is connected to the rear frame portion 12b.

Referring to FIG. 2c, the outer member 34 (and optionally the inner member 36) are tubular, and accordingly, the outer member 34 has an inner surface 38 that is generally cylindrical and the inner member 36 has an outer surface 40 that is generally cylindrical, thereby permitting the pivotal movement of the inner member 36 relative to the outer member 34. Additionally, a projection 42 is provided on one of the outer and inner members 34 and 36, which is engaged in a helical slot 44 in the other of the first outer and first inner members 34 and 36. The projection 42 cooperates with the slot 44 to drive translational movement of the inner member 36 relative to the outer member 34 during pivotal movement of the inner member 36 in the outer member 34.

The second frame portion 12b is positionable via the first pivot connection 29 in a use position (FIG. 2a) in which the wheel associated with the second frame portion 12b (i.e. the rear wheel 14) is orientable to be coplanar with the main frame portion 12a and to be engageable with the ground surface 30 to support the folding bicycle 10 thereon, and in a folded position (FIG. 2b) in which the rear wheel 14 is laterally adjacent to the main frame portion 12a. Movement from the use position to the folded position is in the clockwise direction shown by arrow 39 (FIG. 2a).

While the projection 42 is shown on the outer member 34 and the slot 44 is shown on the inner member 36 it is possible to provide the slot 44 on the outer member 34 and the projection 42 on the inner member 36. Additionally, while the slot 44 may be helical, it could alternatively have other shapes to accelerate and decelerate (i.e. to control) the amount of lateral movement that takes place during particular portions of the pivotal movement between the use position and the folded position. Thus, the slot 44, in a broader sense, would be suitable to cooperate with the projection 42 as long as the slot 44 extends laterally by a selected amount and circumferentially by a selected amount about the outer member axis AP.

Preferably, to reduce friction between the inner and outer members 36 and 34, a pair of suitable bushings 46 can be produced between them. The bushings 46 may be made from any suitable material, such as a polymeric material. A suitable bushing may be provided by igus inc, Rhode Island, United States. Alternatively or additionally, a suitable lubricant (e.g. grease) may be provided between the inner and outer members 36 and 34 to reduce friction, if needed.

By positioning the rear wheel 14 adjacent to the main frame portion 12a, the length L of the folding bicycle can be reduced without the necessity of providing a pocket of room for the folded rear frame portion 12b and wheel 14 within the bottom of the main frame portion 12a itself, as is the case with some other folding bicycle designs. This is advantageous in that it renders it less obvious that the bicycle 10 is a folding bicycle. Furthermore, it renders the main frame portion 12a and the overall bicycle 10 stronger as there are fewer restrictions on the design of the main frame portion 12a that would otherwise compromise the strength of the main frame portion 12a.

Figure 3A:
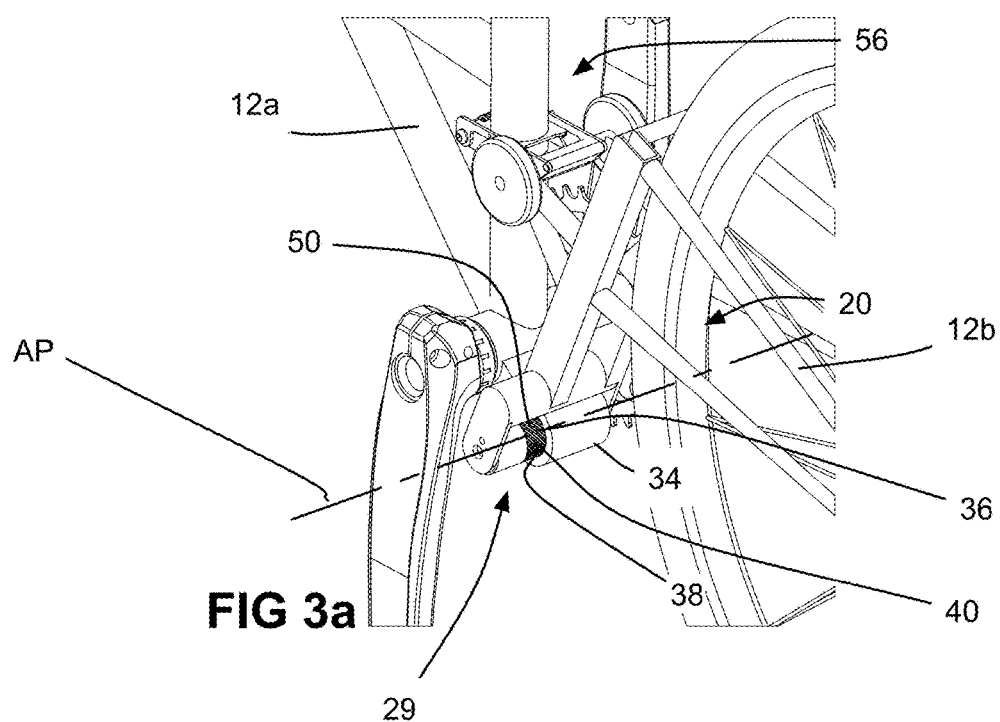
FIGS. 3a and 3b are perspective views of the portion of the folding bicycle shown in FIG. 1a, illustrating the folding of the rear frame portion using an alternative pivot connection.
Figure 3B:
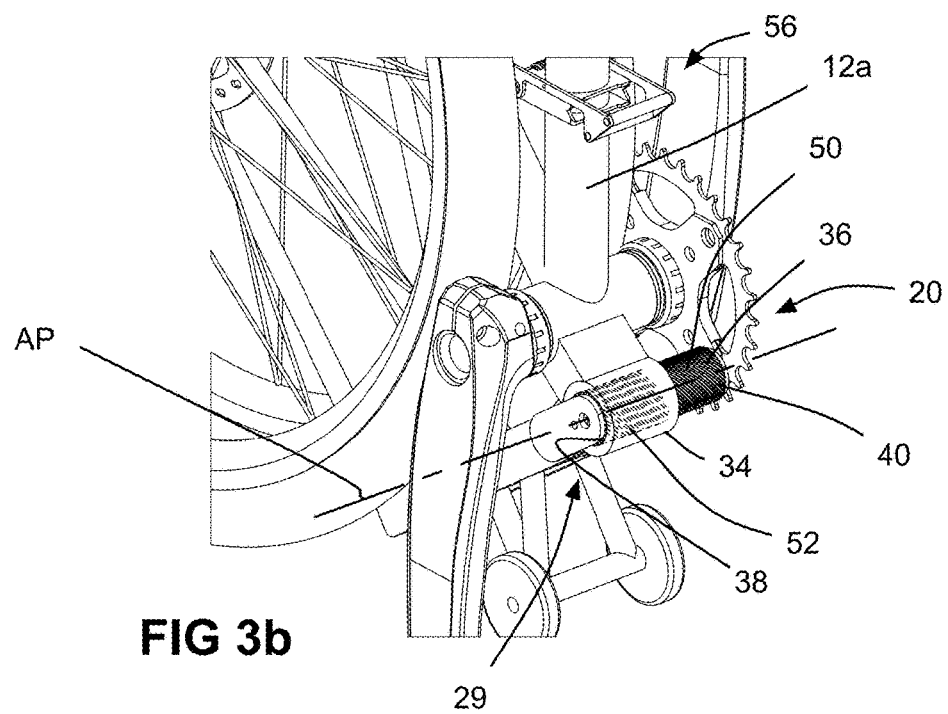

In an alternative embodiment shown in FIGS. 3a and 3b, the projection 42 and the slot 44 may be replaced by an inner member threaded portion 50 on the outer surface 40 of the inner member 36, that mates with an outer member threaded portion 52 (shown in dashed lines) on the inner surface 38 of the outer member 34. The threads cooperate to drive the inner member 36 laterally as it pivots relative to the outer member 34. The rear frame member 12b is shown in the use position in FIG. 3a and in the folded position in FIG. 3b.

Figure 4A:
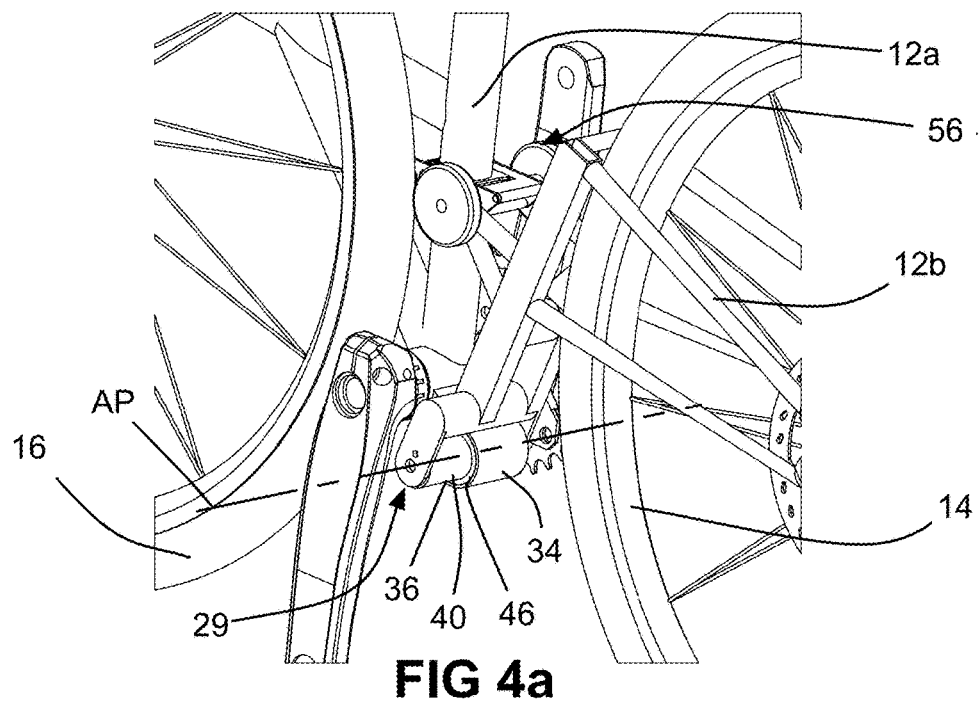
FIGS. 4a and 4b are perspective views of the portion of the folding bicycle shown in FIG. 1a, illustrating the folding of the rear frame portion using another alternative pivot connection.
Figure 4B:
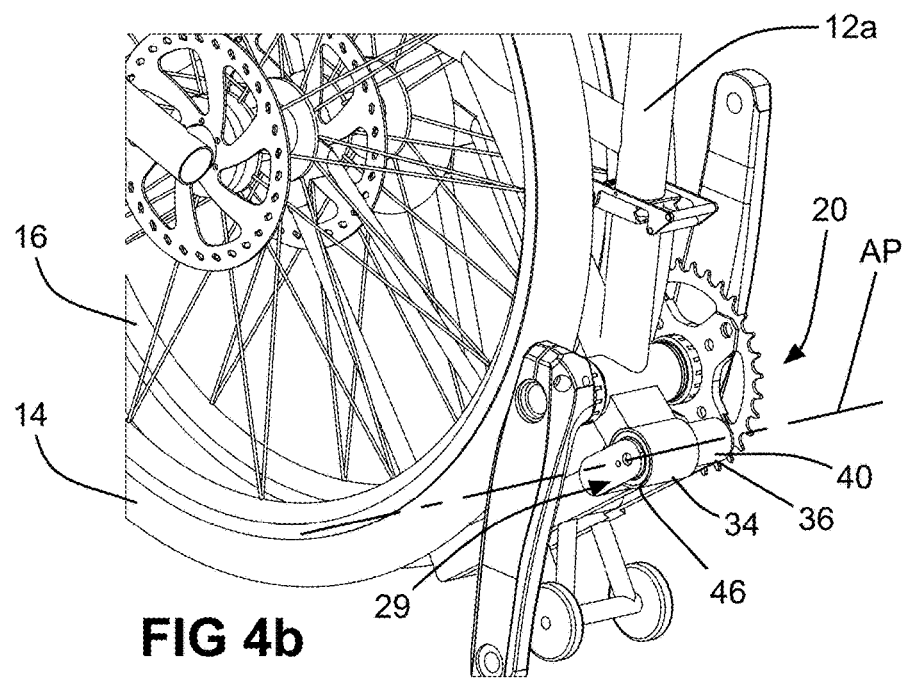

In yet another alternative embodiment, the outer surface 40 of the inner member 36 and the inner surface 38 of the outer member 34 may be free of projections and grooves and the like, so that the inner member 36 is free to move laterally and circumferentially independently of each other, between the use position, shown in FIG. 4a and the folded position shown in FIG. 4b. It will be noted that, in the embodiments shown in FIGS. 2a-2c and 3a and 3b, the rear frame portion 12b may be constrained by the interaction between the projection 42 and 44 (FIGS. 2a-2c) or between the threaded portions 50 and 52 (FIGS. 3a and 3b) to move along a path that brings it alongside the main frame portion 12a when it has fully pivoted to the folded position. By contrast, in the embodiment shown in FIGS. 4a and 4b, the movement of the rear frame portion 12b is unconstrained and so care will need to be taken to ensure that it is moved over laterally sufficiently to ensure that it does not collide with the main frame portion 12a during pivoting movement towards the folded position.

Figure 5:
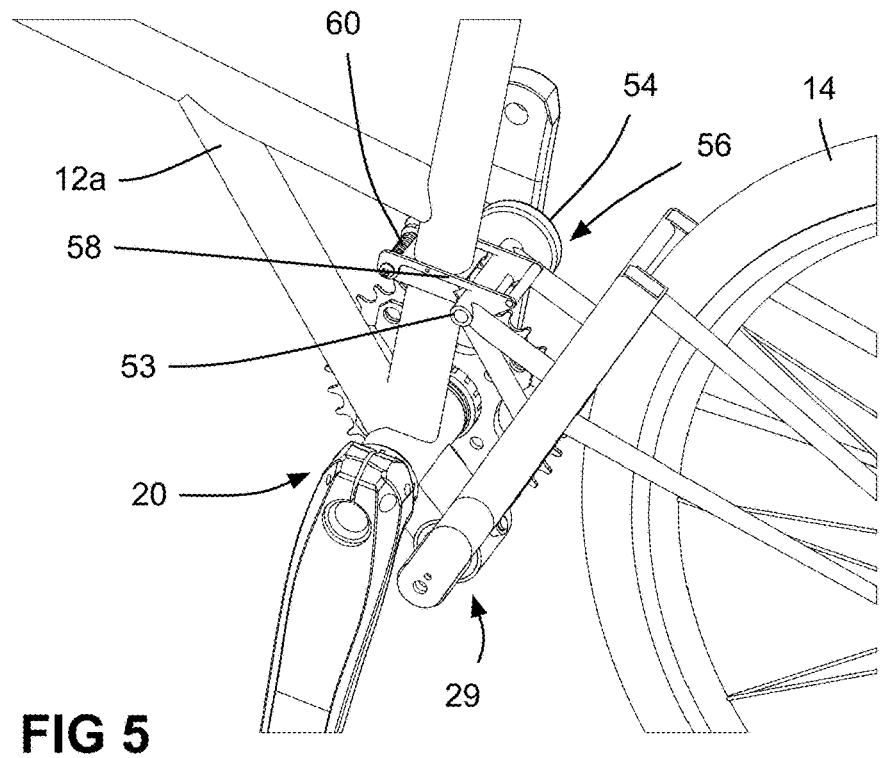

In order to transport the folding bicycle 10 when it is in the folded position, the rear frame portion 12b has an axle 53 supported thereon, and at least one folded position support wheel 54 supported on the axle 53, as shown in FIG. 5. In the embodiment shown, there are two support wheels 54 that are supported on the axle 53. When the rear frame portion 12b is in the use position (FIG. 1a), the folded position support wheels 54 are supported off the ground surface 30. When the rear frame portion 12b is in the folded position (FIG. 1d), the folded position support wheels 54 are engageable with the ground surface 30 to support the folding bicycle thereon. In this way, a user of the bicycle 10 can roll the bicycle 10 on the ground surface 30 on the folded position support wheels 54, even though the rolling ability of the front and rear bicycle wheels 14 and 16 may be compromised due, for example, to friction between the wheels 14 and 16 and the main frame portion 12a.

Figure 6:
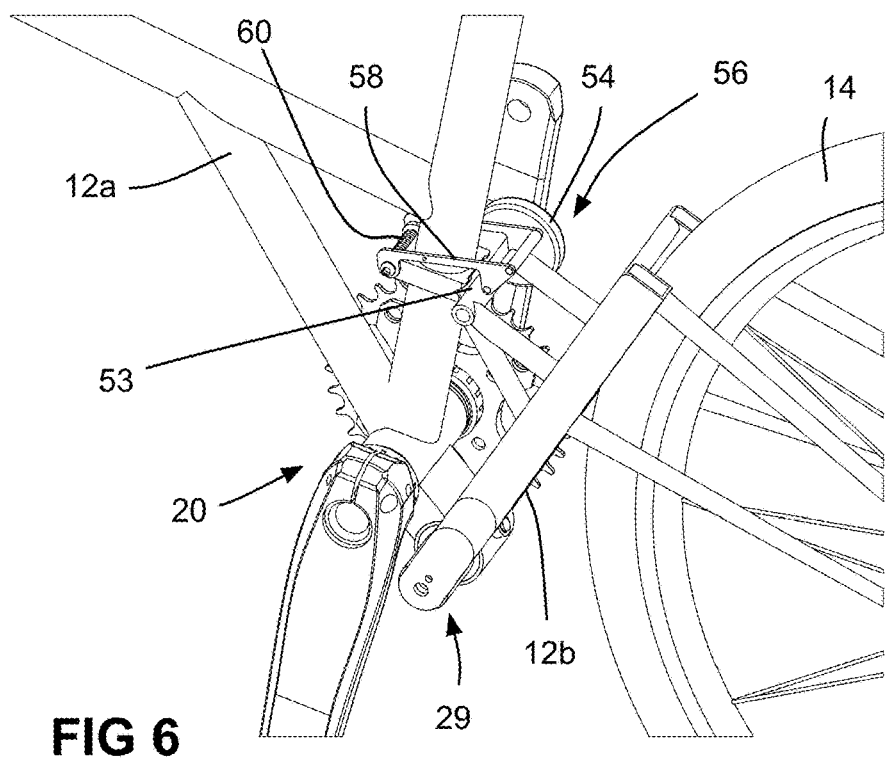

As shown in FIG. 5, to lock the rear frame portion 12b to the main frame portion 12a in the use position, a locking mechanism shown at 56 is provided. The locking mechanism 56 includes a hook member 58 that is pivotally connected to the main frame portion 12a, for movement between an engagement position (shown in FIG. 5), in which the hook member 58 is positioned to engage the axle 53 to retain the rear frame portion 12b in the use position, and a release position (shown in FIG. 6) in which the hook member 58 is positioned to permit movement of the rear frame portion 12b away from the use position.

A biasing member 60 urges the hook member 58 towards the engagement position, so that in the event of a force (e.g. the bicycle 10 hitting a bump) that might urge the hook member 58 upwards off the axle 53, the biasing member 60 can hold the hook member 58 down in engagement with the axle 53.

Referring to FIG. 9b, the second pivot connection shown at 32, which is provided between the front wheel support 12c and the main frame portion 12a. The second pivot connection 32 may be similar to the first pivot connection 29 and includes an outer member 64 and an inner member 66, which may be similar to the outer and inner members 34 and 36 respectively. In the embodiment shown, the outer member 64 has a projection 68 thereon and is mounted on the main frame portion 12a. The inner member 66 has a slot 70 that receives the projection 68 that extends both laterally and circumferentially by selected amounts so that the front wheel support is movable between a use position (FIG. 1a) in which the front wheel 16 is engageable with the ground surface 30 to support the folding bicycle 10 thereon, and a folded position (FIG. 1c), which reduces at least one of the length L and the height H of the folding bicycle 10. In the folded position, the front wheel 16 may be adjacent to the main frame portion 12a. In the use position the front wheel 16 is orientable to be coplanar with the main frame portion 12a. More particularly, the front wheel 16 is connected to the front wheel support 12c, which, due to its connection to the steering tube 28, permits the front wheel 16 to be steered in a range of desired orientations. When the front wheel support 12c is in the folded position, the front wheel 16 is adjacent the main frame portion 12a, but when the front wheel support 12c is in the use position, the front wheel 16 may be oriented to be straight at which point it will be coplanar with the main frame portion 12a.

As shown in FIG. 1b, the front wheel support 12c may be a single support arm 77 that extends to and supports the front wheel axle (shown at 72) only on one side of the front wheel 16. When the front wheel support 12c is in the folded position, the front wheel 16 is positioned laterally between the front wheel support 12c and the main frame portion 12a. This permits the wheel 16 to be positioned closer to the main frame portion 12a when in the folded position (as shown in FIG. 7c), so as to reduce the width W of the folding bicycle 10 when folded, as compared to an embodiment in which a more traditional double-sided fork is used to support the wheel 16. As shown in FIG. 7c, the wheel 16 can be positioned immediately adjacent the main frame portion 12a when forming the front wheel support 12c as a single support arm.

The rear frame portion 12b is shown in FIG. 1b as having two support arms 74 that extend on either side of the rear wheel 14 to support the axle of the rear wheel (shown at 76). It is alternatively possible for the rear frame portion 12b to have a single support arm, as shown at 78 in FIGS. 7a and 7b. When the rear frame portion 12b is in the folded position, the rear wheel 14 is positioned laterally between the support arm 78 and the main frame portion 12a. This can permit the wheel 14 to be positioned closer to the main frame portion 12a when in the folded position (as shown in FIG. 7c), so as to reduce the width W of the folding bicycle 10 when folded, as compared to an embodiment in which two support arms 74 are used to support the wheel 14. As shown in FIG. 7c, the wheel 14 can be positioned immediately adjacent the main frame portion 12a when using a single support arm 78.

In an advantageous embodiment, as shown in FIGS. 9a and 9b, the front wheel support 12c has a front wheel support connecting end axis A12c, and a first end face 71 that extends in a first end face plane P12c that is generally normal to the first end face axis A12c. The steering tube 28 has a steering tube connecting end axis A28 and a second end face 73 that extends in a second end face plane P28 that is generally normal to the steering tube connecting end axis A28. The front wheel support 12c is pivotable between a use position (FIG. 9b) in which the front wheel support connecting end axis A12c is aligned with the steering tube connecting end axis A28, in which the first and second end faces 71 and 73 abut one another, and in which the front wheel 16 is engageable with a ground surface for supporting the folding bicycle 10 thereon, and a folded position (FIG. 9a) in which the front wheel support connecting end axis A12c is unaligned with the steering tube connecting end axis A28, and in which the first and second end faces 71 and 73 are spaced from one another. Such a structure is particularly suited to supporting the weight of a rider on the folding bicycle 10, while being space efficient.

The front wheel support 12c may be lockable in the use position by any suitable locking mechanism. An example of a locking mechanism is shown at 80 in FIGS. 8a and 8b. The locking mechanism 80 includes a base member 82, an expandable member 84, a driver 86, a driver biasing member 88 and a quick release mechanism 90. The driver 86 is used to drive expansion of the expandable member 84 against the inner surfaces (shown at 92 and 94 in FIG. 8c) of first and second tubes (shown at 96 and 98 in FIGS. 8c, 9a and 9b) that are part of the main frame portion 12a and the front wheel support 12c respectively, so as to releasably lock the main frame portion 12a and the front wheel support 12c together.

The base member 82 defines a base member axis AL. The expandable member 84 may be expandable by any suitable means. The expandable member 84 may, for example, have a first end 100 and a second end 102, and may have a plurality of pass-through slots 104, that alternately start from each end 100 and 102 and extend most of the way to, but not all the way to, the opposing end 100 and 102. The expandable member 84 has an inner surface 106 that is a first wedge surface (FIG. 8b).

The driver 86 includes a foot member 108, a connecting rod 110 and a wedge member 112 which has a second wedge surface 114 thereon. The driver 86 is movable in a first direction (shown by arrow 116 in FIG. 8b) relative to the base member 82 to drive the first and second wedge surfaces 106 and 114 into each other to drive expansion of the expandable member 84. The driver 86 is movable in a second direction (shown by arrow 118 in FIG. 8b) relative to the base member 82 to drive the first and second wedge surfaces 106 and 114 away each other to permit contraction of the expandable member 84.

In a preferred embodiment, the first and second wedge surfaces 106 and 114 extend away from the axis AL in two cross-sectional planes (shown at P1 and P2 in FIG. 8b) that both include the axis AL and that are orthogonal to one another. It will be noted that plane P2 is directly coincidental with the axis AL in FIG. 8b and so it appears as a solid line superimposed on the axis AL. In the example embodiment shown in FIGS. 8a and 8b, the wedge surfaces 106 and 114 are generally conical. Alternatively, any other shape may be possible, such as, for example, pyramidal.

In the embodiment shown, the driver 86 is moved relative to the base member 84 by a driver biasing member 118 that is positioned between the foot member 108 and the second end 102 of the expandable member 84. The driver biasing member 118 urges the foot member 108 and the expandable member 84 apart, which drives the wedge surfaces 106 and 114 into each other.

The quick release mechanism 90 includes a transfer arm 120 and a handle 122. The handle 122 is pivotally connected to the base member 82 via a pin connection 124 that defines a handle pivot axis. The transfer arm 120 is pivotally connected at one end 128 to the driver 86 via a pin connection 130, and at another end 132 to the handle 122 via another pin connection 134 which defines a handle connection axis that is offset from the handle pivot axis.

Figure 8A:
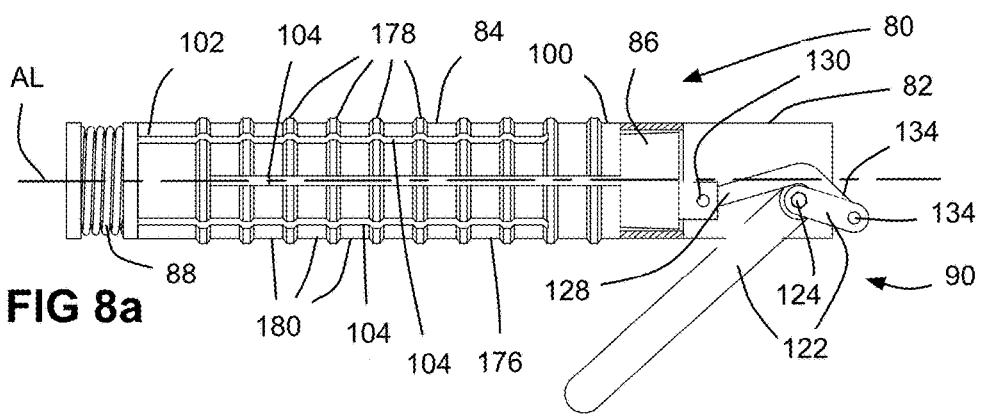
Figure 8B:
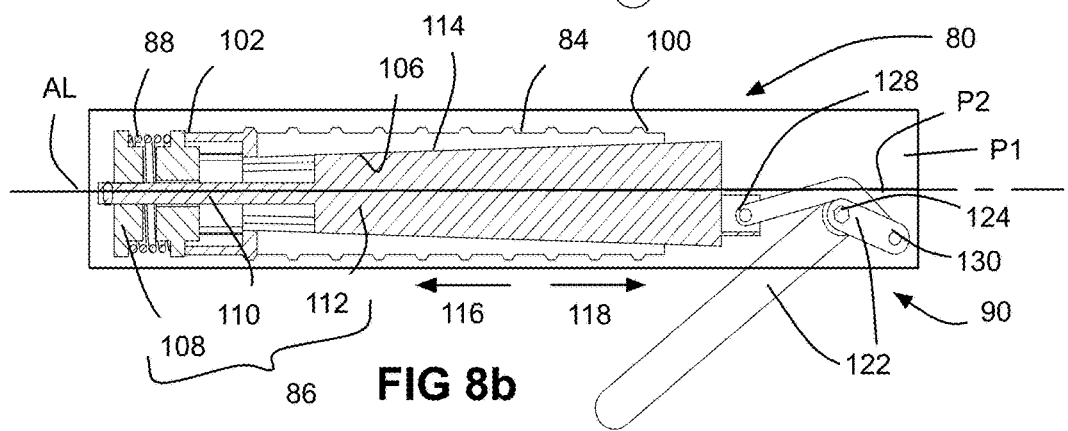
FIGS. 8b and 8c are sectional elevation views of the locking mechanism shown in FIG. 8a, in a locking position and a release position respectively.
Figure 8C:
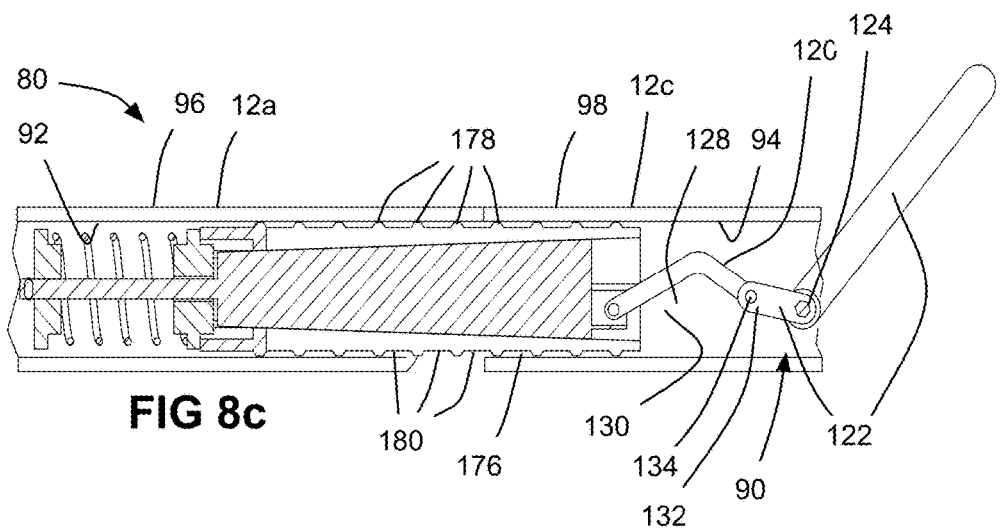

The handle 122 is pivotable between an unlocking position, shown in FIGS. 8*a* and 8*b* and a locking position shown in FIG. 8*c*. In the unlocking position the transfer arm 120 is oriented to transfer force from the driver biasing member 88 to the handle 122 to urge the handle 122 to remain in the unlocking position. Additionally, in the unlocking position, the transfer arm 120 limits the position of the driver 86 relative to the expandable member 84 so as to prevent the driver 86 from causing expansion of the expandable member 84.

In the locking position the driver biasing member drives first and second wedge surfaces 106 and 114 into one another to drive the expansion of the expandable member 84.

While the second wedge surface 114 has been shown to be on the driver 86, it is alternatively possible for the second wedge surface 116 to be on the base member 82, and for a driver to drive the wedge surface 106 on the expandable member 84 into engagement with the wedge surface 114 on the base member 82.

Figure 10A:
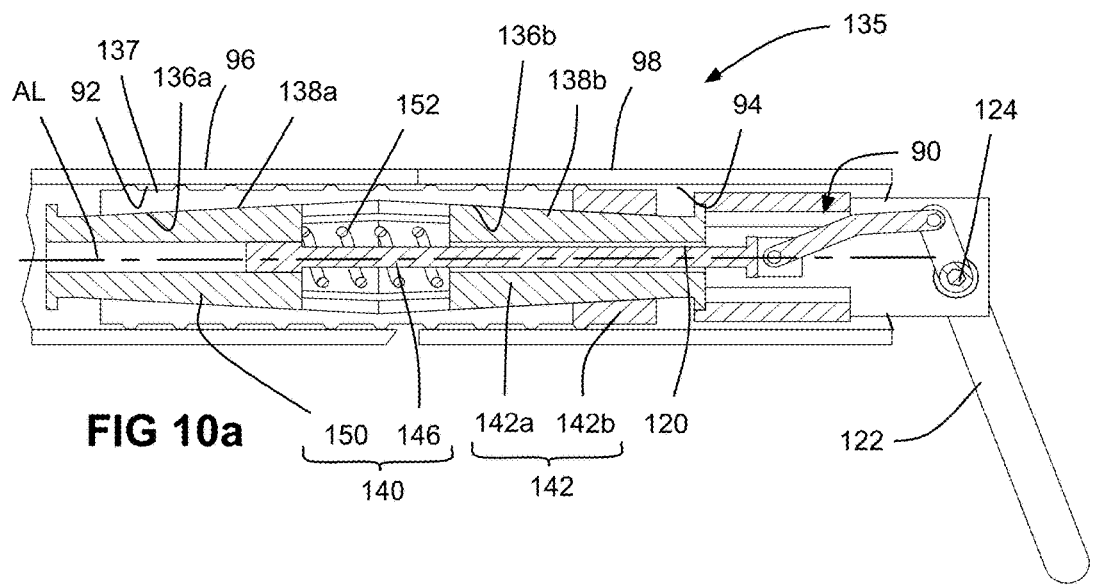
FIGS. 10a and 10b are sectional elevation views of a variant of the locking mechanism shown in FIG. 8a, in a locking position and a release position respectively.
Figure 10B:
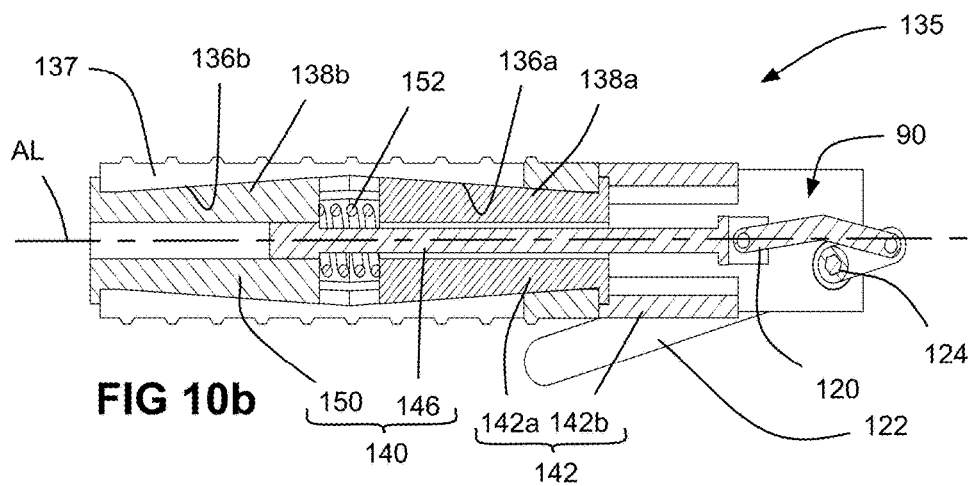

In an alternative embodiment shown in FIGS. 10*a* and 10*b*, the locking mechanism is shown at 135, and is similar to the locking mechanism 80, but has two first wedge surfaces, one of which is shown at 136*a* and another of which is shown at 136*b*. The two wedge surfaces 136*a* and 136*b* are provided on the expandable member shown at 137. The wedge surface 136*a* faces in a first axial direction (where 'axial' refers to the axis AL). In the view shown in FIGS. 10*a* and 10*b*, the first axial direction is towards the left). The wedge surface 136*b* faces in a second axial direction (i.e. towards the right in the view shown in FIGS. 10*a* and 10*b*). Furthermore, there are two second wedge surfaces, a first one of which is shown at 138*a* and is on the driver shown at 140 and a second one of which is shown at 138*b* and is provided on the base member shown at 142. More particularly the wedge surface 138*b* is on an extension member 142*a* that is connected to a main portion 142*b* of the base member 142. The second wedge surfaces 138*a* and 138*b* are complementary to the first wedge surfaces 136*a* and 136*b*. The driver 140 includes a connecting arm 146 that has a first end 148 that pivotally connects to the transfer arm 120, and a second end that fixedly connects to a wedge member 150 on which the wedge surface 138*a* is positioned. A driver biasing member 152 is provided, which is, in the example shown positioned between the wedge member 150 and the extension member 142*a* (or, more broadly, between the driver 140 and the base 142), urging the wedge member 150 and the extension member 142*a* away from each other, which is in a direction that drives them towards engagement with the first wedge surfaces 136*a* and 136*b*.

When the handle 122 of the quick release mechanism 90 is positioned in a locking position, which is shown in FIG. 10*a*, the biasing member 152 drives the two second wedge surfaces 138*a* and 138*b* apart, which drives them into engagement with the first wedge surfaces 136*a* and 136*b*, which causes expansion of the expandable member 137. It will be noted that the symmetry of the first and second, first wedge surfaces 136*a* and 136*b* and the corresponding symmetry of the first and second, second wedge surfaces 138*a* and 138*b* makes it more likely to provide generally equal amounts of expansion at both ends of the expandable member 137. This makes it more likely that the forces with which the expandable member 137 engages the first tube 96 (FIG. 10*a*) and second tube 98 are approximately equal.

When the handle 122 of the quick release mechanism 90 is in the unlocking position shown in FIG. 10*b*, (which would involve a clockwise rotation of the handle 122 from the position shown in FIG. 10*a*), the transfer arm 120 is oriented to transfer force from the driver biasing member 152 to the handle 122 to urge the handle 122 to remain in the unlocking position. Additionally, in the unlocking position, the transfer arm 120 limits the positions of the second wedge surfaces 138*a* and 138*b* relative to the first wedge surfaces 136*a* and 136*b* so as to prevent the driver 140 from causing expansion of the expandable member 137.

Figure 11A:
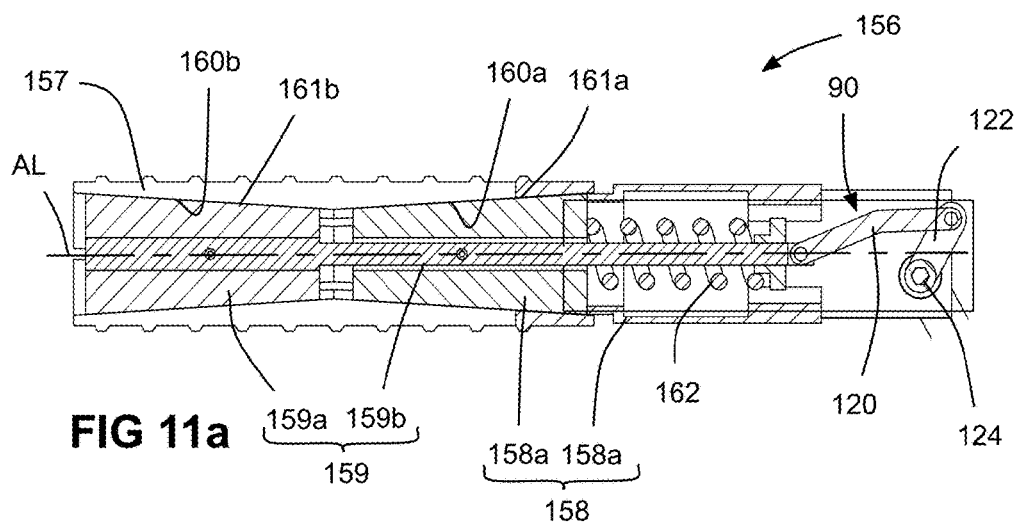
FIGS. 11a and 11b are sectional elevation views of another variant of the locking mechanism shown in FIG. 8a, in a locking position and a release position respectively.
Figure 11B:
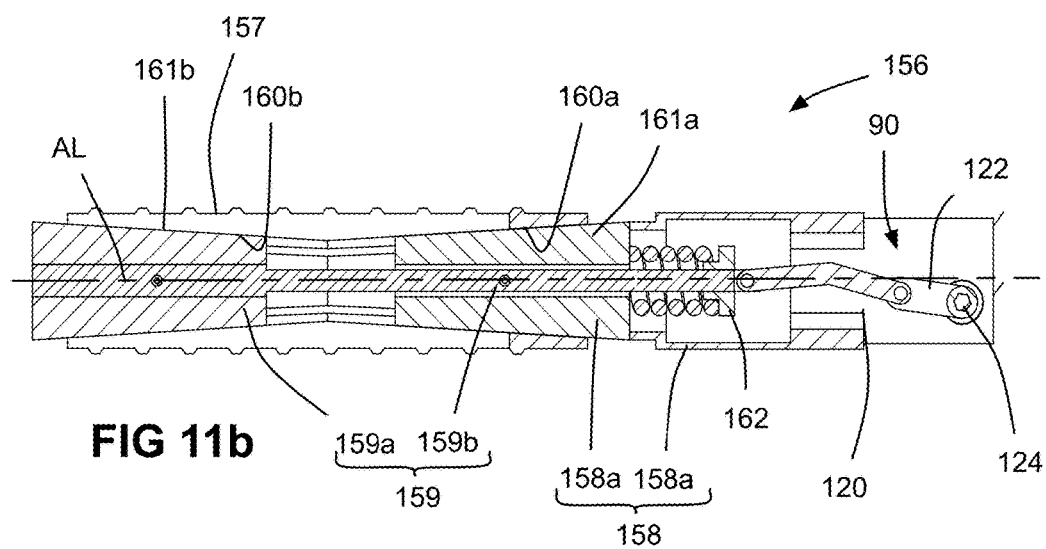

Reference is made to FIGS. 11*a* and 11*b*, in which another embodiment of a locking mechanism is shown at 156. The locking mechanism 156 is similar to the locking mechanism 135, and has an expandable member 157, a base 158 that includes an extension member 158*a* and a main portion 158*b*, and a driver 159 that includes a wedge member 159*a* and a transfer arm 159*b* that pivotally connects to the connecting arm 120 of the quick release mechanism 90. The main portion 158*b* of the base 158 is shown simply as a rectangle, for convenience. Additionally, a portion of the handle 122 is omitted from FIGS. 11*a* and 11*b*, for convenience. All of the components of the aforementioned components of the locking mechanism 135 may be similar to the analogous elements of the locking mechanism 135 in FIGS. 10*a* and 10*b*, but with differences as described below.

A difference with the locking mechanism 156 from the locking mechanism 135 is that the first wedge surfaces (shown at 160*a* and 160*b*) generally face away from each other, instead of facing each other as the first wedge surfaces 136*a* and 136*b* do in the embodiment shown in FIGS. 10*a* and 10*b*, and the second wedge surfaces (shown at 161*a* and 161*b*) face each other instead of facing away from each other as they do in the embodiment shown FIGS. 10*a* and 10*b*. Also, in the embodiment shown in FIGS. 11*a* and 11*b*, the driver biasing member, shown at 162, is positioned between a foot member 164 on the transfer arm 159*b* from the driver 159 and the extension member 158*a* of the base 158.

As shown in FIG. 9*b*, the handle 122 may extend through a locking mechanism engagement control slot 170 in one of the first and second tubes 96 and 98 so as to be accessible by a user of the bicycle 10 from outside of the tubes 96 and 98. The slot 170 has a first end 172 and a second end 174. Movement of the handle 122 to the first end 172 withdraws the locking mechanism 80 substantially entirely out of the other of the first and second tubes 96 and 98. In the example shown, it withdraws the locking mechanism 80 substantially entirely out of the first tube 96 (and substantially entirely into the second tube 98, as shown in FIG. 9*a*). Movement of the handle 122 to the second end 174 of the slot 170 drives the locking mechanism 80 to a position in which the locking mechanism 80 is partially positioned in both the first and second tubes 96 and 98 (FIG. 9*b*), so as to permit expansion of the locking mechanism 80 so as to lock the first and second tubes 96 and 98 together.

Figure 1E:
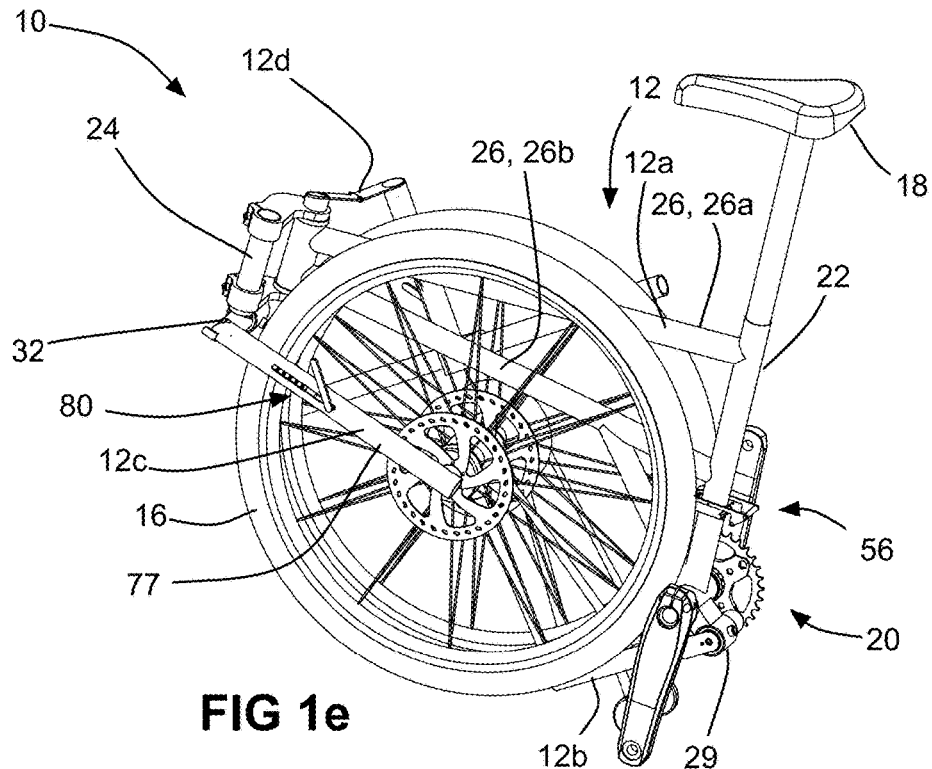
FIG. 1e is a perspective view of the folding bicycle shown in FIG. 1a in a further folded position.
Figure 1F:
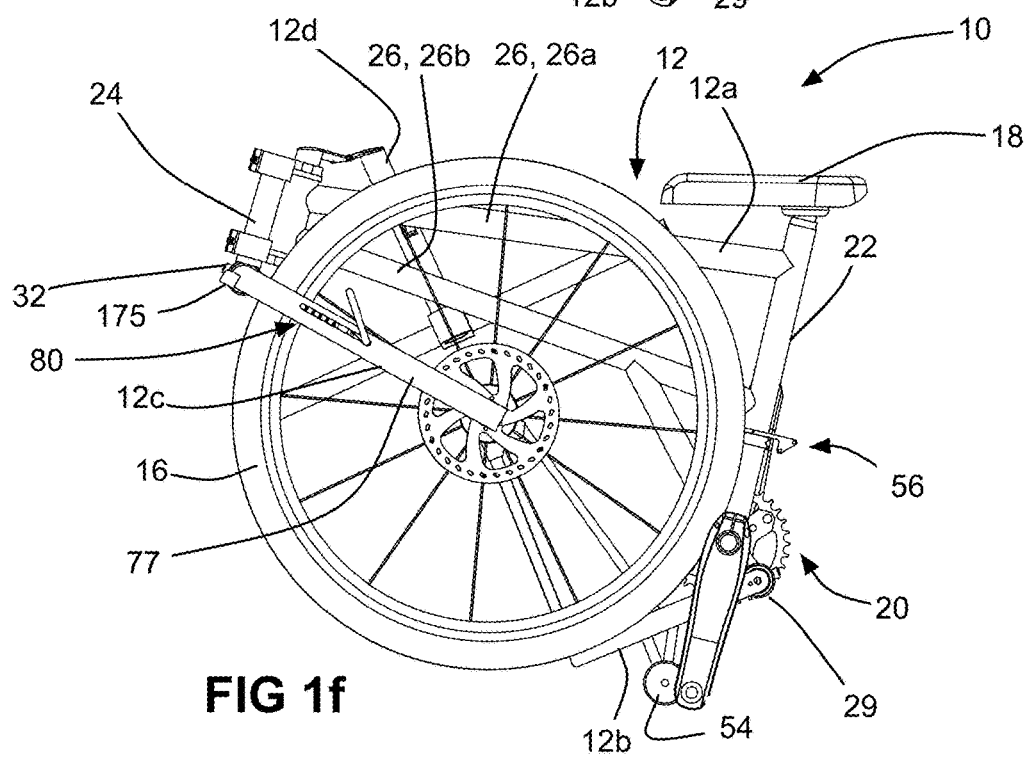
FIGS. 1f and 1g are an elevation view and a perspective view respectively of the folding bicycle shown in FIG. 1a in a fully folded position.

As shown in FIGS. 1*f* and 9*b*, a guide member shown at 175 may be provided on the end of the second tube 98, which engages the first tube 96 when the front wheel support 12*c* reaches the use position to ensure that the first and second tubes 96 and 98 are in good alignment with one another, thereby facilitating bringing the locking mechanism upwards into the first tube 96.

As shown in FIG. 8*a*, the expanding member 84 may have an outer surface 176 that includes a plurality of projections (some of which are shown at 178) and valleys 180 between the projections 178. The projections 178 act as force concentrators which assist in biting into the inner surfaces 92 and 94 of the first and second tubes 96 and 98. In a preferred embodiment, the projections 178 extend generally only circumferentially about the outer surface 176 so as to provide strong resistance to axial movement (movement along the axis AL). However, the projections 178 could extend in other directions, e.g. they could extend helically, or even axially. Alternatively, the expandable member 84 could have any other type of outer surface 176, such as, for example, an outer surface that has no projections thereon.

Figure 12B:
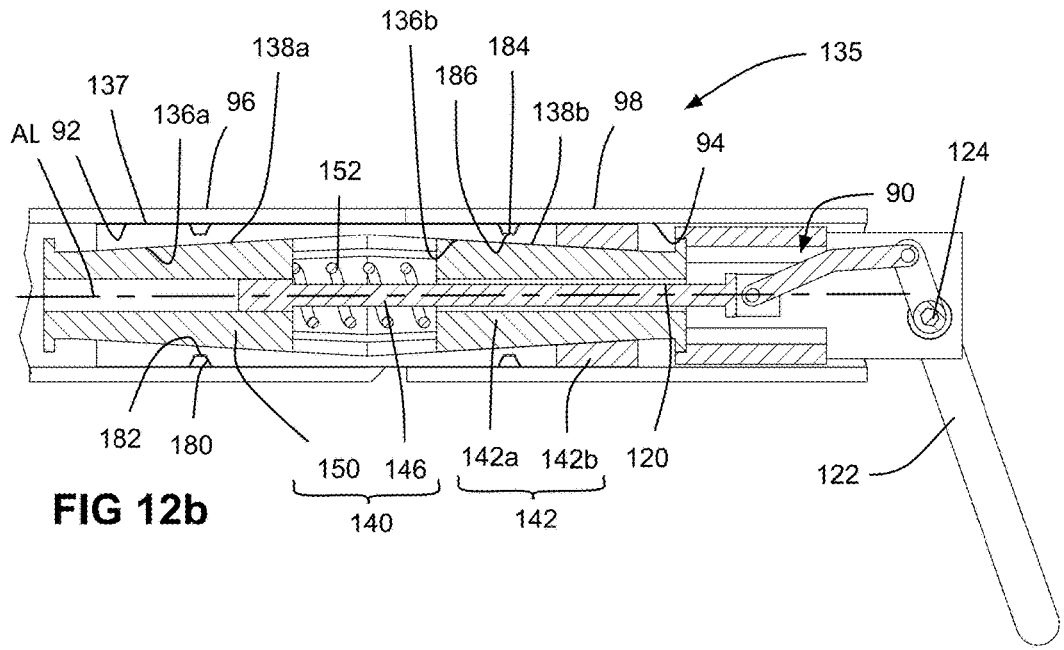
FIGS. 12a and 12b are sectional elevation views of the variant of the locking mechanism shown in FIGS. 10a and 10b, in a locking position and a release position respectively, showing optional projections and recesses that assist in holding the locking mechanism in position.
Figure 12A:
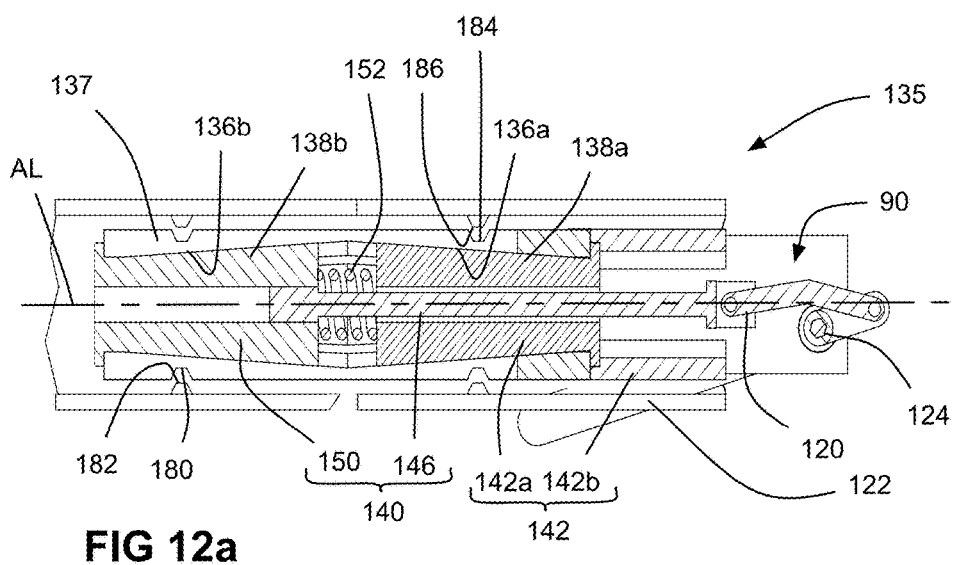

In an embodiment, shown in FIGS. 12*a* and 12*b*, the expandable member of the locking mechanism may have a first circumferentially extending recess 180 thereon. In FIGS. 12*a* and 12*b* the locking mechanism is the example that is shown in FIGS. 10*a* and 10*b* (i.e. locking mechanism 135) however, any of the other locking mechanisms 80 or 156 could have the aforementioned recess. One of the first and second tubes 96 and 98 may have a first circumferentially extending projection 182 thereon that is matable with the recess 180. The first projection 182 is withdrawn from the first recess 180 when the expandable member 135 is unexpanded, as shown in FIG. 12*b*, so as to permit the locking mechanism 135 to be withdrawn from the first tube 96, thereby permitting the folding of the frame portion 12*c*. Referring to FIG. 12*a*, when the expandable member 135 is expanded the first recess 180 receives the first projection 182 to lock the expandable member 135 in place axially (relative to axis AL) so as to retain the expandable member 135 in engagement with both the first and second tubes 96 and 98. In the embodiment shown, the first projection 182 is shown on the first tube 96, however, it could alternatively be on the second tube 98, with the recess 180 positioned accordingly. As shown in FIGS. 12*a* and 12*b*, the expandable member 135 may optionally have a second circumferentially extending recess 184 and the other of the first and second tubes 96 and 98 (in this case tube 98) has a second circumferentially extending projection 186. The first and second recesses 180 and 184 receive the first and second projections 182 and 186 to retain the expandable member 135 in engagement with both the first and second tubes when the expandable member is expanded. The first and second projections 182 and 186 are withdrawn from the first and second recesses 180 and 184 when the expandable member 135 is unexpanded.

Figure 13:
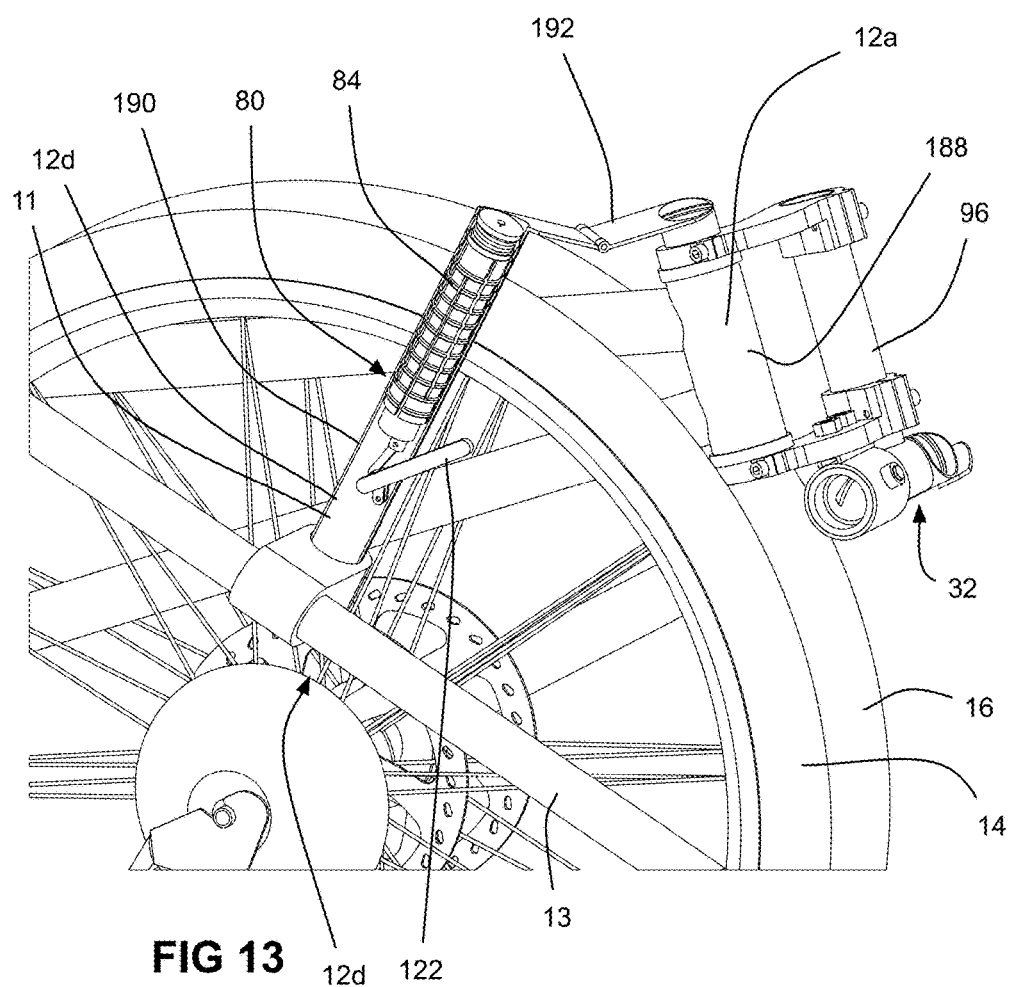
FIG. 13 is a perspective view of a portion of the folding bicycle shown in FIG. 1a showing a handlebar portion of the frame in a folded position, sectioned to shown the locking mechanism shown in FIG. 8a therein.

The locking mechanism is shown in use between a first frame portion (i.e. frame portion 12*a*) and a second frame portion (i.e. frame portion 12*c*). However, as shown in FIG. 13, the locking mechanism can alternatively or additionally be used to connect other pairs of frame portions, such as, for example, the main frame portion 12*a* and the handlebar frame portion 12*d* (in which case, the first frame portion would again be portion 12*a* and the second frame portion would be the handlebar frame portion 12*d*). In this case, the first and second tubes are shown at 188 and 190, and are connected by a hinge 192. In this example, the handlebar frame portion 12*d* is movably connected to the steering tube 28 (via the hinge 192) for movement between a use position in which the handlebar 13 is holdable by a rider of the folding bicycle 10 for steering the front wheel 16 and a folded position (shown in FIG. 13) to reduce the height and width of at least a portion of the folding bicycle 10.

Instead of providing a quick release mechanism for the locking mechanisms 80, 135 and 156, another means for locking and unlocking the locking mechanism may be provided, such as, for example, a threaded rod that is fixed to the wedge member and a nut that is fixedly connected to the base member. Rotation of a hand knob or the like can cause rotation of the rod, which would drive the rod and the attached wedge member axially, thereby controlling locking and unlocking of the locking mechanism.

Figure 14A:
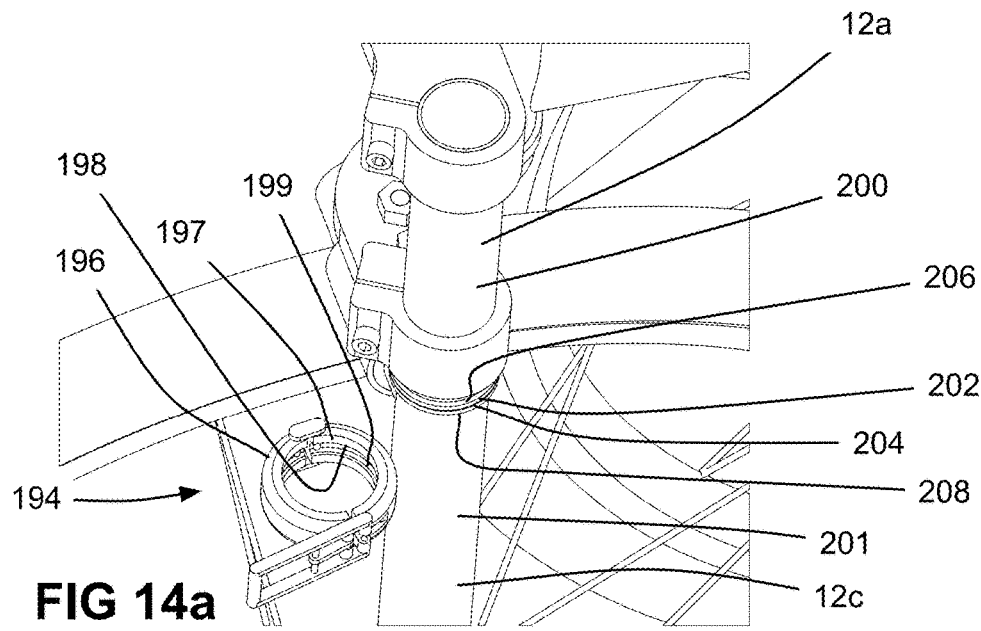
FIGS. 14a and 14b are perspective views that show an alternative locking mechanism to that shown in FIG. 8a, unmounted and mounted to the frame of the folding bicycle.
Figure 14B:
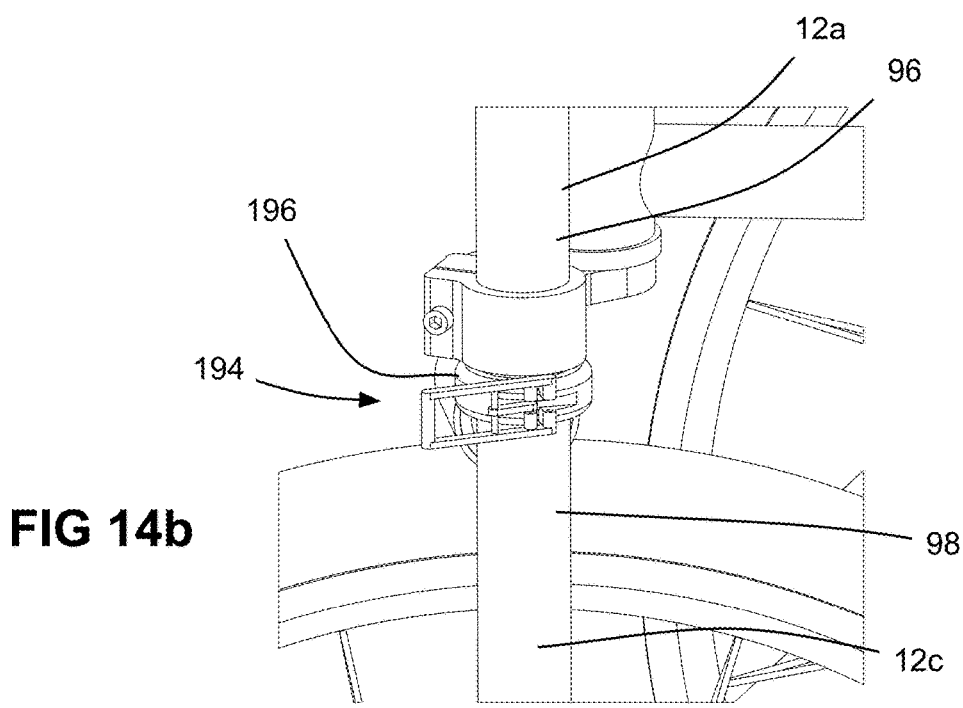

As an alternative to the locking mechanisms 80, 135, 156, shown in FIGS. 8*a*-13, a locking mechanism 194 may be provided, as shown in FIGS. 14*a* and 14*b*. The locking mechanism 194 includes an over-center latch 196 that includes an inner surface 197 that has first and second mutually facing bevel surfaces 198 and 199. First and second tubes shown at 200 and 201 which are part of first and second frame portions (in this case frame portions 12*a* and 12*c*), may have first and second flanges 202 and 204 thereon. The flanges 202 and 204 have bevel surfaces 206 and 208 that face away from one another. The over-center latch 196 is shown off the tubes 200 and 201 in FIG. 14*a* however in practice it would remain around one of the tubes when not in use. When the first and second tubes 200 and 201 abut one another, the over-center latch 196 can be slid (upwards or downwards, as the case may be) over the two flanges 202 and 204 and can be latched, as shown in FIG. 14*b*), thereby driving clamping engagement of the bevel surfaces 198 and 199 with the bevel surfaces 206 and 208.

It will thus be understood that the locking mechanism may be any suitable type of locking mechanism, and is not intended to be limited to the particular examples shown and described.

Figure 15:
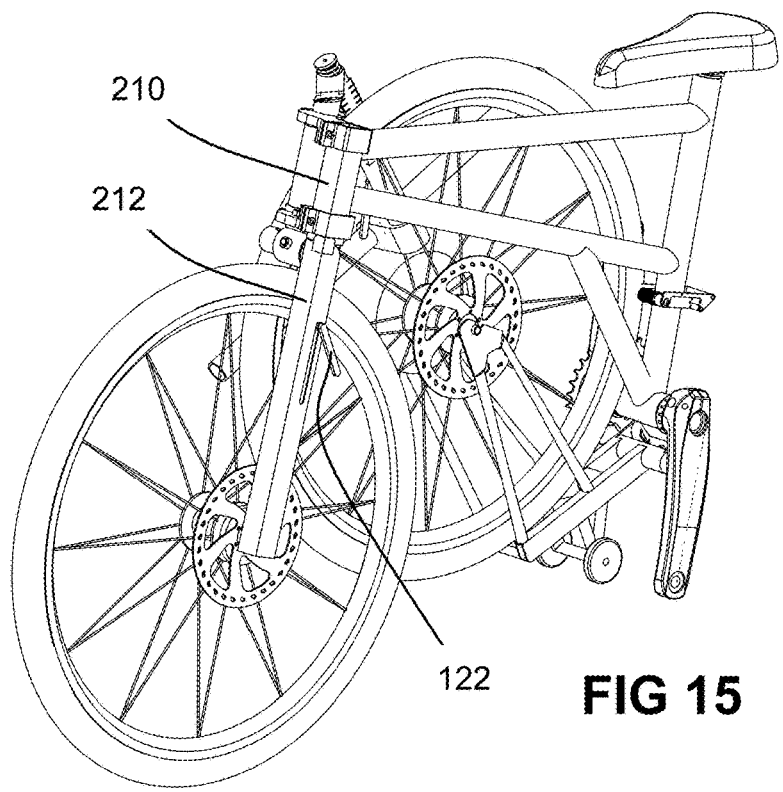
FIG. 15 is a perspective view of the folding bicycle shown in FIG. 1a in a partially folded position, illustrating an alternative front wheel support that is square.
Figure 16:
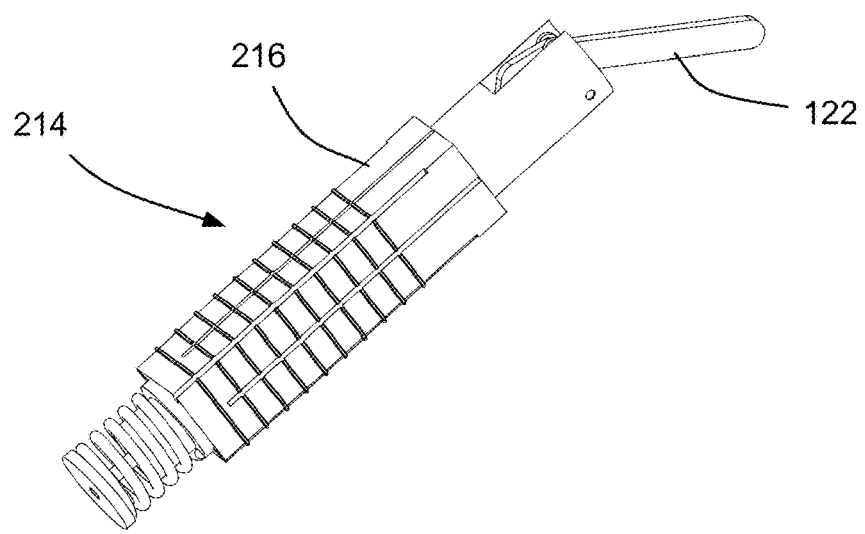
FIG. 16 is a perspective view of a locking mechanism that is square that is for use with the front wheel support on the folding bicycle shown in FIG. 15.

With reference to FIG. 15, it will be noted that the first and second tubes in which the locking mechanism is positioned need not be cylindrical. For example, the tubes shown at 210 and 212 are generally square in cross-section. The locking mechanism itself may also be square, as shown in FIG. 16, at 214. In such an embodiment, the wedge surfaces that engage one another to cause expansion of the expansion member (shown at 216) would be pyramid-shaped instead of conical.

Referring to FIGS. 1*a*-1*i*, to fold the folding bicycle 10 from the use position shown in FIGS. 1*a* and 1*b*, one can unlock the locking mechanism 80, 135, 156 that holds the front wheel support 12*c* in the use position, and fold the front wheel support 12*c* (counterclockwise from the view shown in FIG. 1*a*) to the folded position shown in FIG. 1*c* where the front wheel support 12*c* and consequently the front wheel 16 are positioned on the second side 27 of the first frame portion 12*a*. One can unlock the rear frame portion 12*b* by lifting the hook member 58 to the release position (FIG. 6) and by pivoting the rear frame portion 12*b* (clockwise in the view shown in FIG. 1*c*) to the folded position shown in FIG. 1*d* where the rear frame portion 12*b* and consequently the rear wheel 14 are positioned on the first side 25 of the first frame portion 12*a*. With the rear frame portion 12*b* in the folded position, the handlebar portion 12*d* of the frame 12 can be unlocked and can be folded over to the folded position, as shown in FIG. 1*e*.

Figure 17:
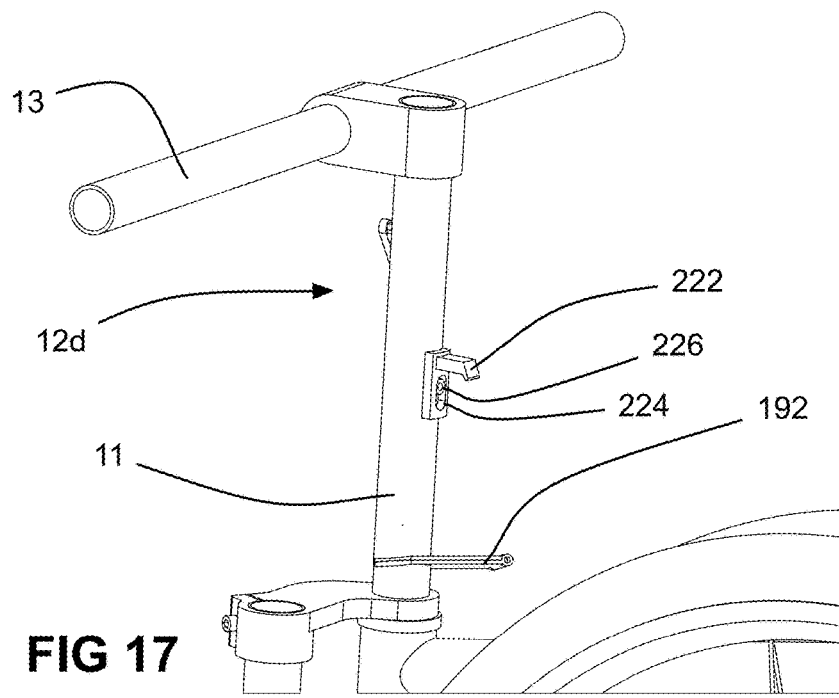
FIG. 17 is a perspective view of a portion of the folding bicycle shown in FIG. 1a, showing a holding member that is used to hold the rear frame portion of the folding bicycle in a folded position.
Figure 18:
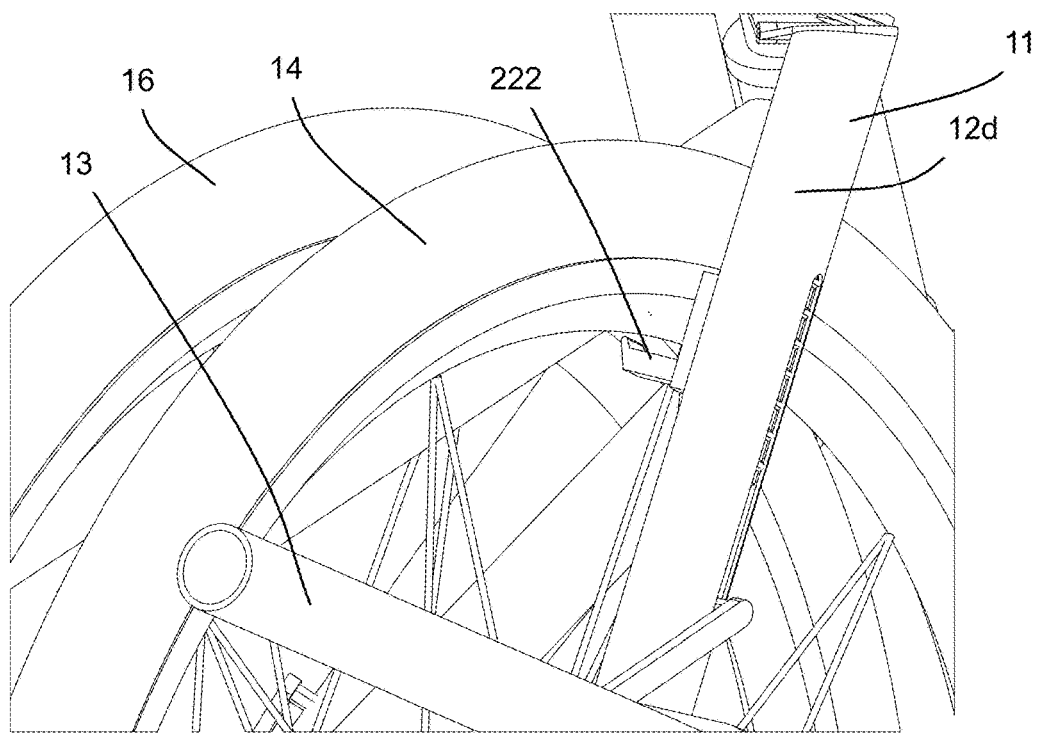
FIG. 18 is a perspective view of the portion of the folding bicycle shown in FIG. 17, showing the holding member holding the rear frame portion of the folding bicycle in the folded position.

It will be noted that, when the second frame portion 12*b* is in the folded position, it would be beneficial to provide a way of holding it in the folded position. A rear frame portion folded position holding member for this purpose is shown at 222 in FIGS. 17 and 18. The holding member 222 may be a hook that is mounted to the handlebar support 11. When the handlebar portion 12*d* is folded over, as shown in FIG. 18, the holding member 222 winds up being positioned underneath the rim of the wheel 14, so that it hooks the rim and prevents the wheel 14 and the rear frame portion 12*b* from pivoting back towards the use position. Optionally, the holding member 222 may be connected to the handlebar support 11 via a slotted aperture and a threaded fastener, as shown at 224 and 226 respectively to permit some adjustability in the position of the holding member 222 to suit the user's preference.

Figure 1G:
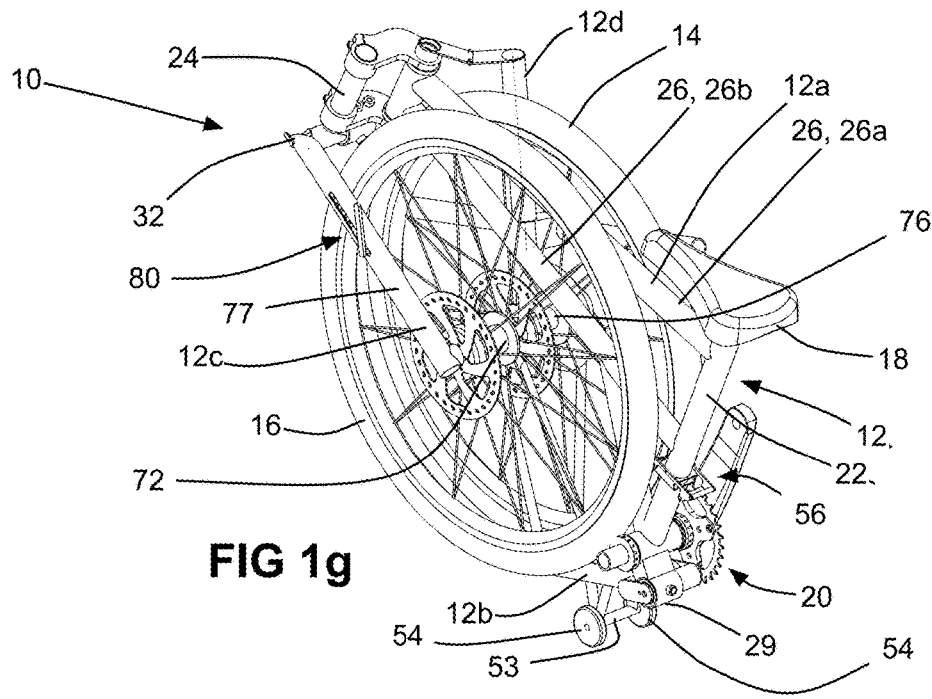
Figure 1H:
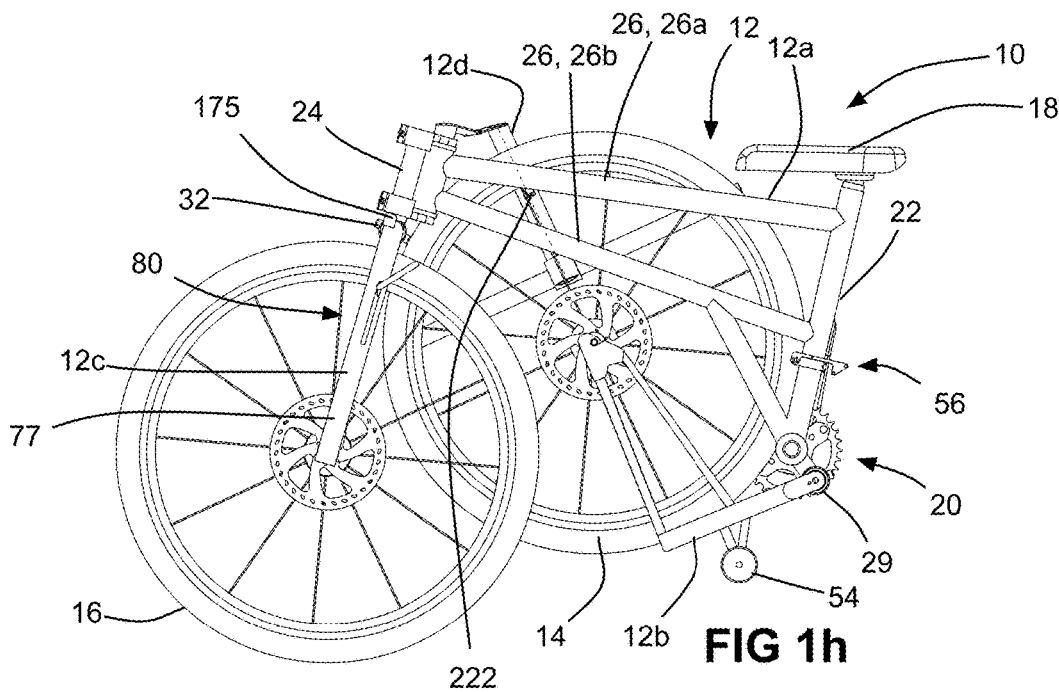
FIG. 1h is an elevation view of the folding bicycle shown in FIG. 1a in a partially unfolded position.
Figure 1I:
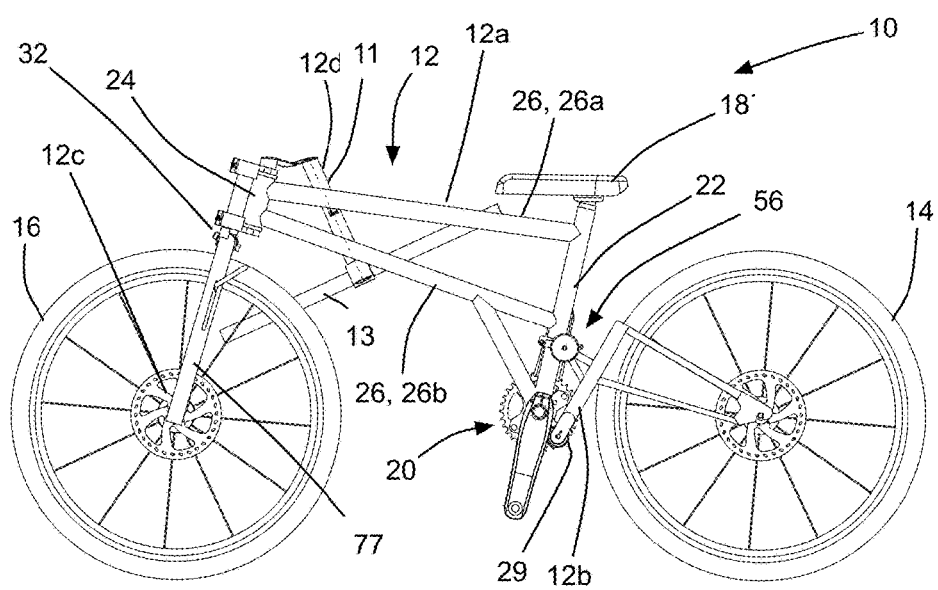
FIG. 1i is an elevation view of the folding bicycle shown in FIG. 1a in a further unfolded position.

The seat 18 may be lowered into the seat tube 22 to reduce the height of the associated region of the folding bicycle 10, as shown in FIG. 1f. FIG. 1g shows the same position of the folding bicycle 10 as FIG. 1f (i.e. the folded position. To open the folding bicycle 10 to the use position from the folded position, one can unfold the front wheel support 12c (by pivoting it clockwise in the view shown in FIG. 1g), to the use position shown in FIG. 1h. Once in position, the locking mechanism 80, 135, 156 (or the locking mechanism 194) can be locked. The holding member 222 can be unhooked from the rear wheel 14 and the rear frame portion 12b can be pivoted back to the use position shown in FIG. 1i and be locked in place by the hook member 58. The handlebar portion 12d can be pivoted up into its use position and locked in place via its locking mechanism and the seat 18 can be raised to its use position, such that the folding bicycle 10 is in the use position shown in FIGS. 1a and 1b. it will be noted that some steps described above can take place in a different order than that described above. For example, during unfolding of the bike 10, the handlebar portion 12d can be raised and locked in its use position before the rear wheel 14 is swung out to its use position.

As shown in FIGS. 1g and 7c, when the folding bicycle 10 is in the folded position (more specifically, when the second and third frame portions are in the folded positions), the front and rear wheel axles 72 and 76 are aligned with one another and are substantially in abutment with one another. As a result, in the event that the folding bicycle 10 receives a lateral force against one or both of the wheels 14 and 16, the abutment of the axles 72 and 76 assists in resisting the force and in inhibiting bending stresses on the front wheel support 12c and/or the rear frame portion 12b as the case may be.

Figure 19:
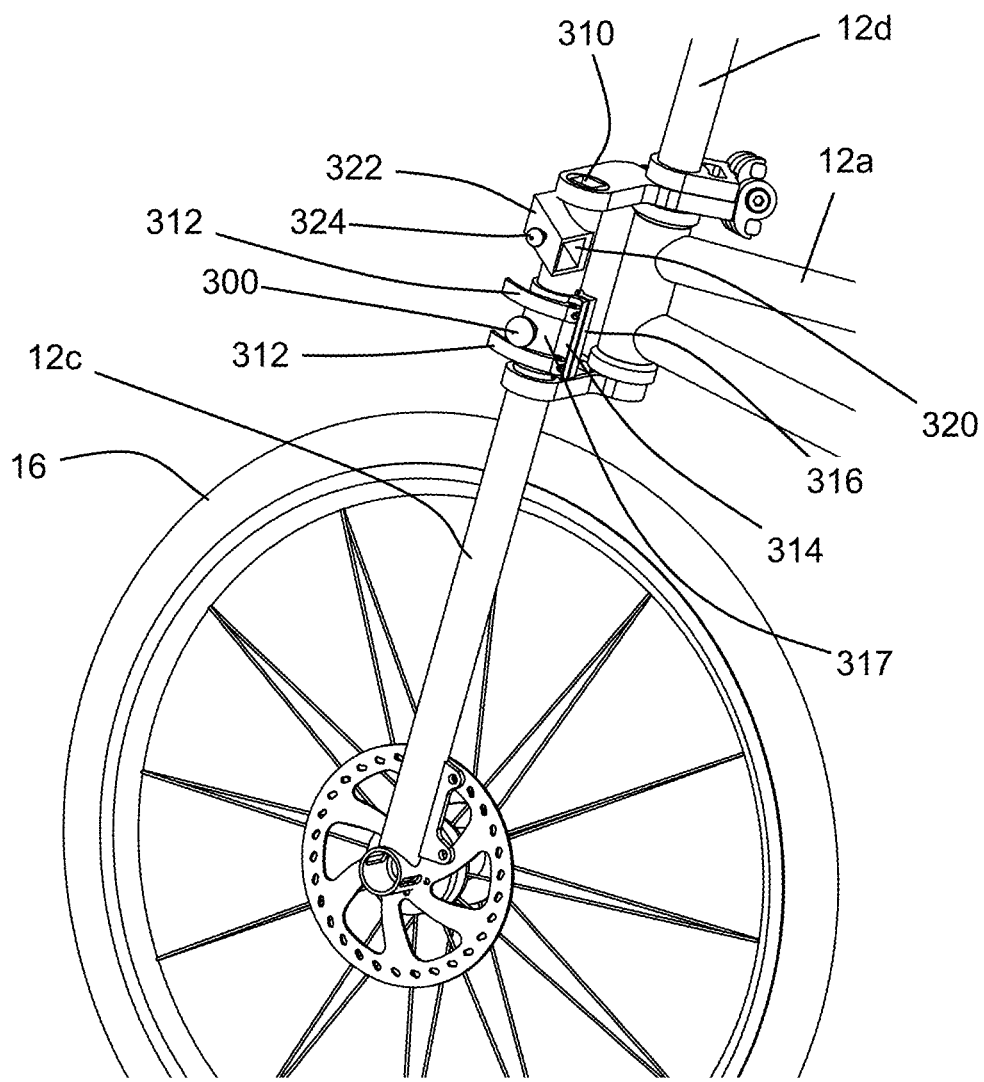
FIG. 19 is a perspective view of a portion of the compactable bicycle shown in FIG. 1, with a removable front wheel support, in a use position.
Figure 20:
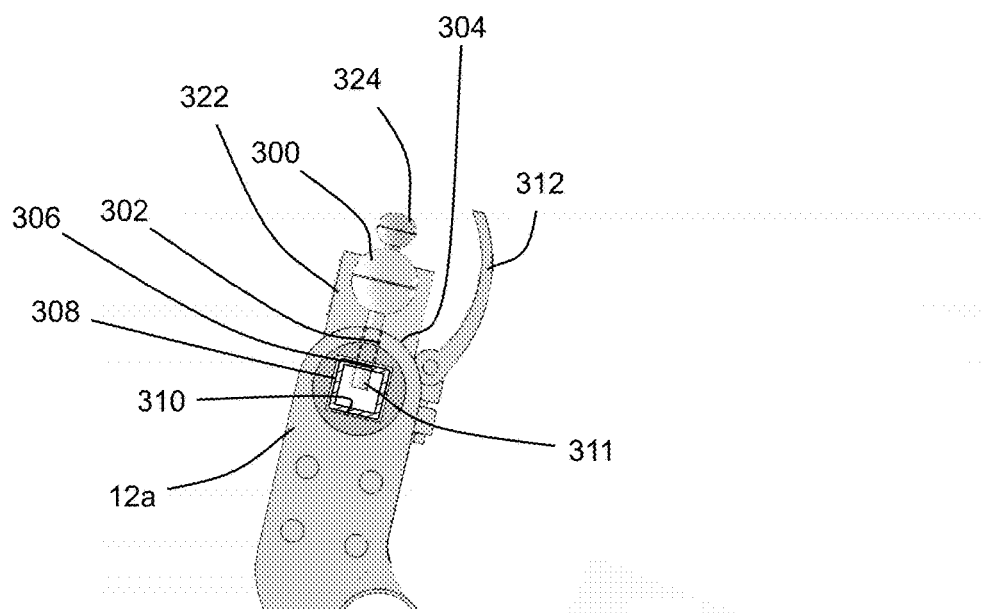
FIG. 20 is a plan view from underneath showing the mounting of the front wheel support shown in FIG. 19.

In the above-described embodiments, the front wheel support is shown and described as pivoting between a use position and a folded position. It will be understood, however, that the front wheel support may move between a use position and a folded position in any suitable way. For example, with reference to FIG. 19, the front wheel support 12c may be movable between a use position and a storage position by being removable from the rest of the bicycle 10 (e.g. from the main frame portion 12a) when in one of the use and storage positions, and being reconnectable to the rest of the bicycle 10 in the other of the use and storage positions. In FIG. 19, the front wheel support 12c is shown in the use position. The front wheel support 12c is shown in the storage position in FIG. 23. In the use position, an alignment pin 300 extends through a first aperture 302 on a portion of the frame 12 aside from the front wheel support 12c (e.g. on a wall 304 of the main frame portion 12a as shown in FIG. 20) and through a second aperture 306 on the front wheel support 12c. To assist in aligning the front wheel 16 when it is in the use position, the free end (shown at 308 in FIG. 19) of the front wheel support 12c may be configured with a non-circular cross-sectional shape, such as a square cross-sectional shape, and the front wheel support receiving aperture shown at 310 on the main frame portion 12a may have a corresponding hollow non-circular (e.g. hollow-square) cross-sectional shape. The alignment pin 300 may be retained in place in the apertures 302 and 306 by any suitable means. For example, the alignment pin 300 may include one or more balls (not shown) along its shaft (shown at 311) and may include a spring-loaded plunger to lock the balls outwardly or to permit the balls to retract radially (for removal or insertion of the pin 300).

Figure 21:
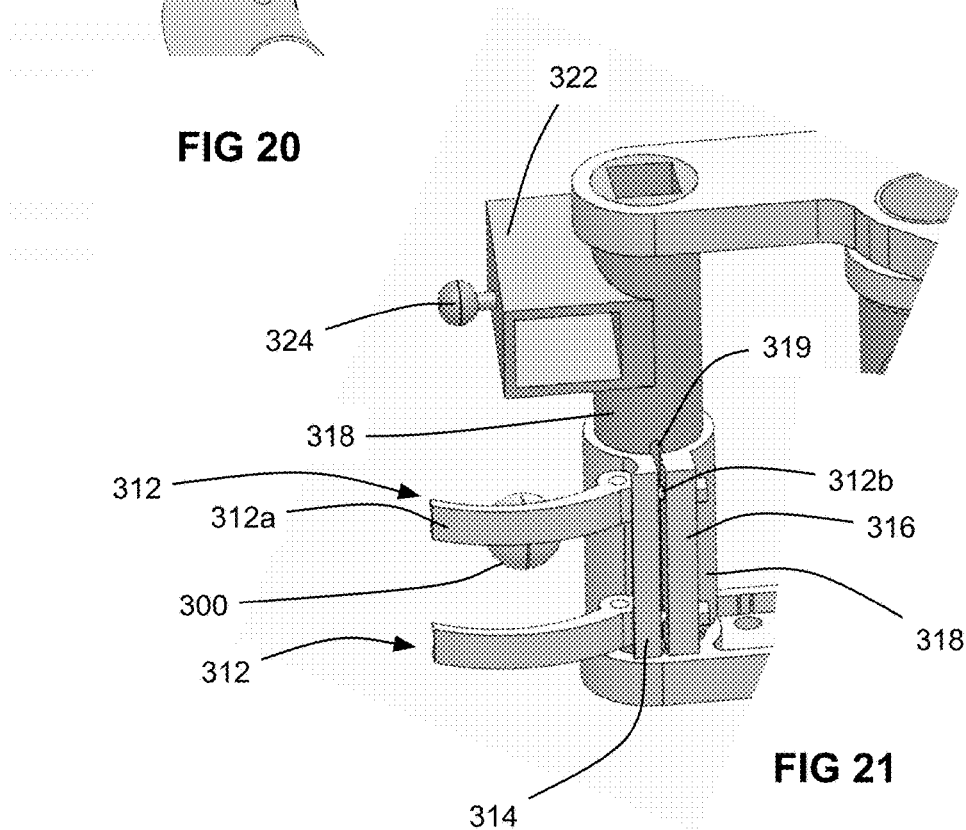
FIG. 21 is a perspective view of a portion of the bicycle shown in FIG. 19 showing a pair of cam-lock members.
Figure 22:
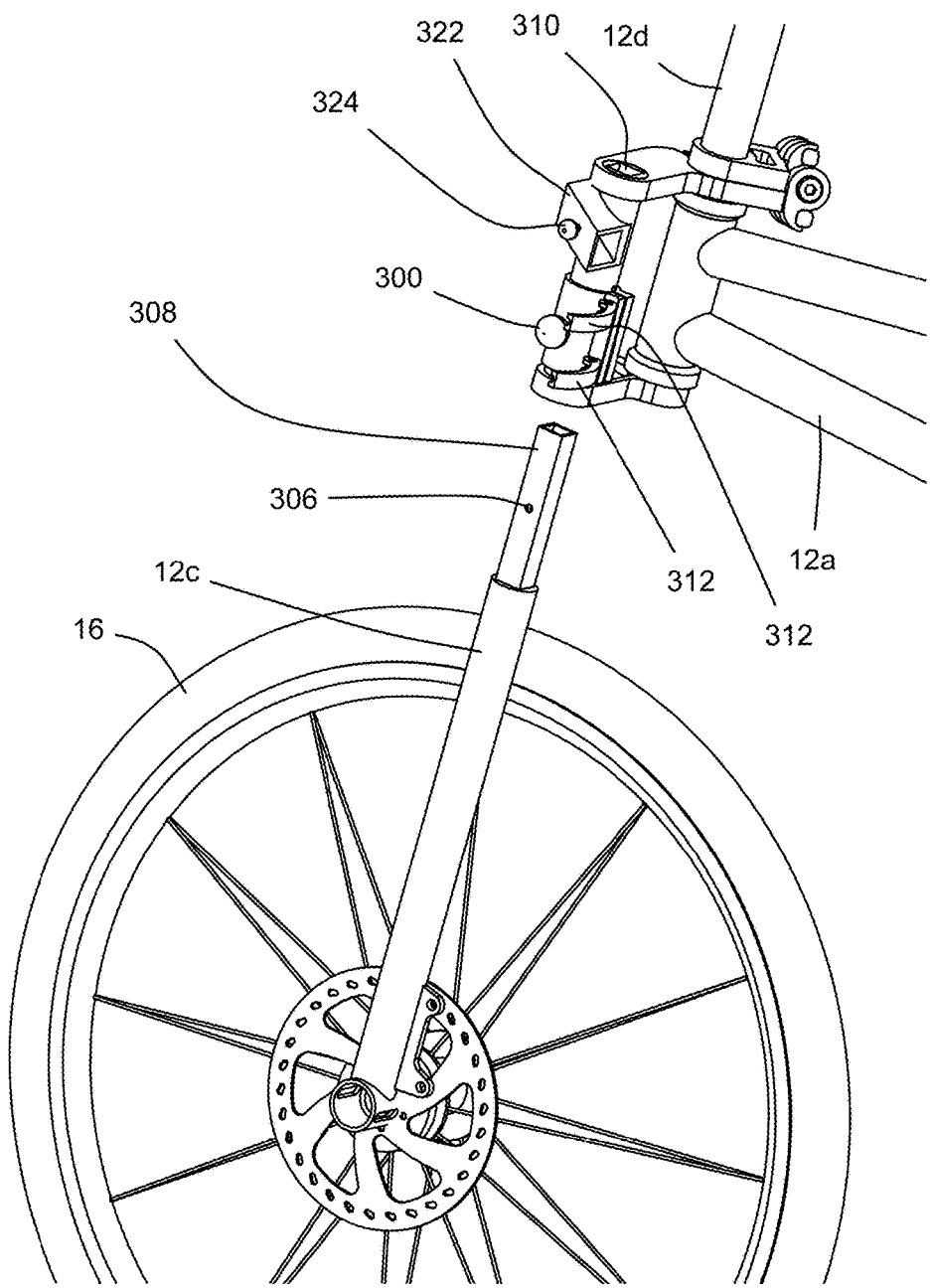
FIG. 22 is a perspective view of the compactable bicycle shown in FIG. 19, with the front wheel support removed from the rest of the frame.
Figure 23:
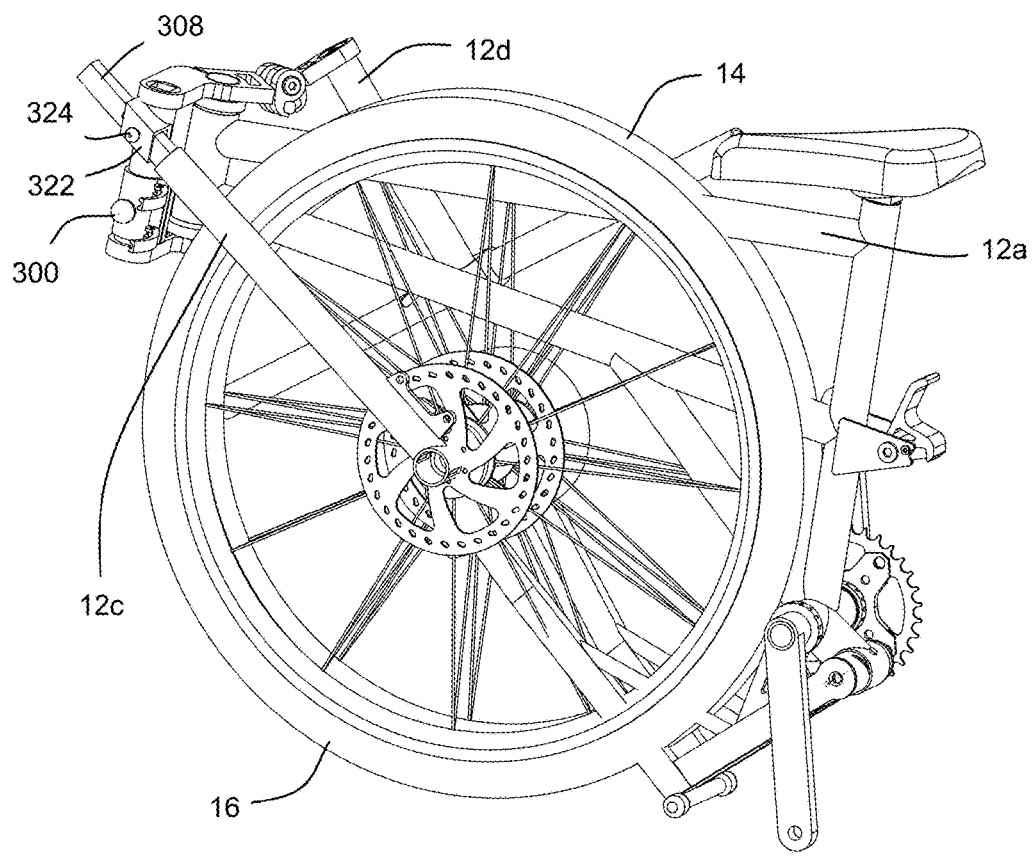
FIG. 23 is a perspective view of the compactable bicycle shown in FIG. 19, with the front wheel support in a storage position.

While there may be a snug fit of the free end 308 of the front wheel support 12c in the aperture 310, there may still remain some play between the two. With reference to FIG. 21, to firmly hold the free end 308 (and therefore the front wheel support 12c in place one or more (in this example, two) cam-lock members 312 are provided, each of which includes a cam-lock lever 312a and a connector rod 312b that passes between two spaced apart flanges shown at 314 and 316 of a clamp member 317. The clamp member 317 surrounds an inner tube 318 that defines the aperture 310. The inner tube 318 has a slot 319 that permits deformation (resilient collapse) of the inner tube 318 against the free end 308 of the front wheel support 12c when the cam-lock levers 312 are moved to their clamping position (FIG. 19), which draws the flanges 314 and 316 towards one another. The cam-lock clamps 312 may be similar to quick-release clamps on a front and rear wheel of a typical bicycle today. The cam-lock clamps are movable between a clamping position (FIG. 19) and a release position (FIGS. 20-22). The inner tube 318 in the embodiment shown in FIGS. 19-23 forms part of the main frame portion 12a.

The front wheel support 12c is shown removed from the main frame portion 12a in FIG. 22. The front wheel support 12c is shown inserted into a storage position receiving aperture 320 on a remaining portion of the frame 12 (e.g. on the main frame portion 12a). The aperture 320 may be provided in a storage position receiving tube 322. A storage position locking pin 324 may pass through an aperture in the tube 322 and through the second aperture 306 in the front wheel support 12c to lock the front wheel support 12c in place in the storage position.

Figure 24:
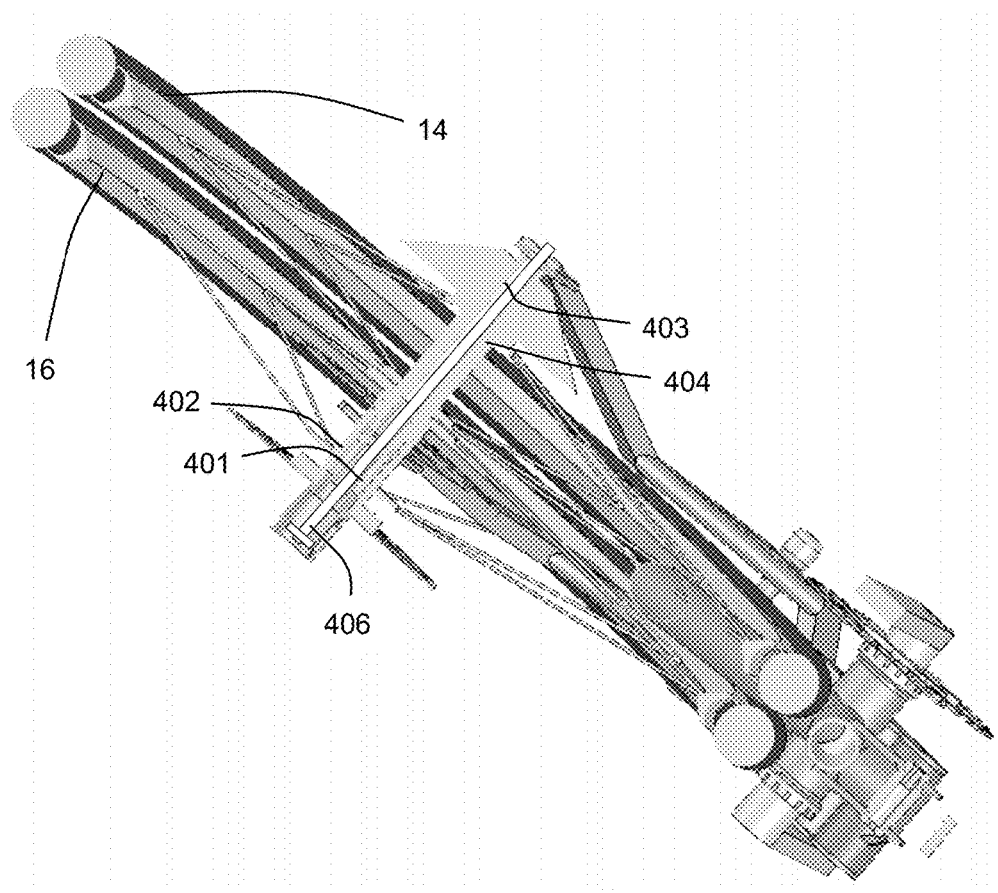
FIG. 24 is a sectional plan view of the bicycle in a storage position, showing an optional pin used to hold the front and rear wheels in axial alignment with one another.

As shown in FIG. 24, it is optionally possible to provide a first axial passageway in the shaft 402 front wheel 16 that is alignable with a second axial passageway in the shaft 404 of the rear wheel 14, such that a ball-plunger pin 406 can pass-through the passageways 401 and 403 to lock the front and rear wheels 16 and 14 in alignment with one another when the bicycle 10 is in the storage position. This facilitates rolling the bicycle 10 along the ground when it is in the storage position.

The locking mechanisms shown for use in locking the portions of the bicycle 10 together could instead be another other suitable type of locking mechanism, such as the locking mechanism shown in U.S. Pat. No. 4,507,034, the contents of which are incorporated herein in their entirety by reference.

Figure 25:
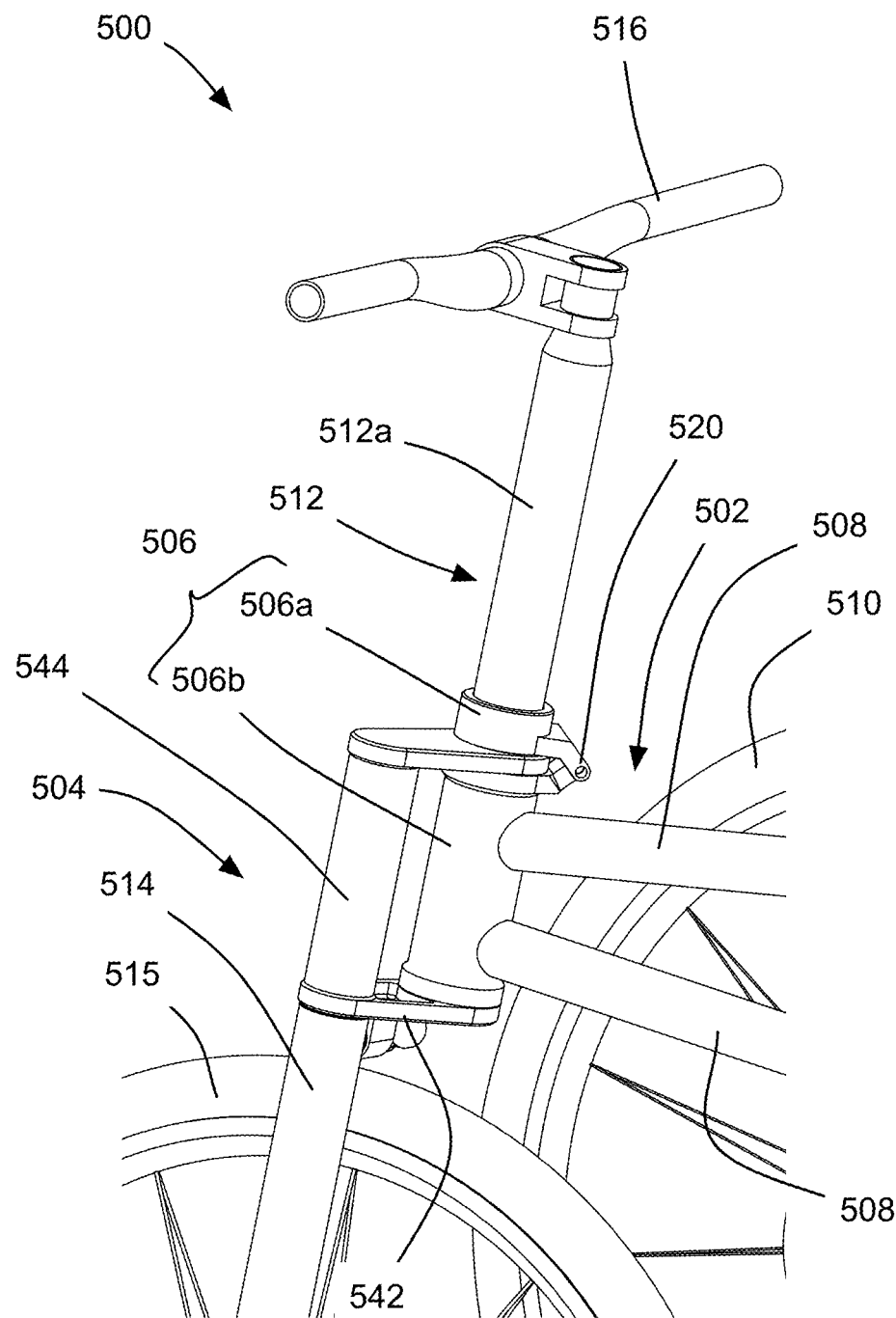
FIG. 25 is a perspective view of a portion of an alternative embodiment of a folding bicycle, with a head tube that is divided into first and second portions, in a use position.

Reference is made to FIGS. 25-30, which show an alternative embodiment of a compactable bicycle at 500. The compactable bicycle 500 includes a base frame portion 502, which may be similar to the base frame portion in FIG. 1a, and a steering structure 504 which may be similar to the steering structure shown in FIG. 1a. Differences between the base frame portion 502 and the steering structure 504 and their counterparts in FIG. 1a are described below. Shown in FIG. 25, are a head tube 506 and two connecting tubes 508 from the base frame portion. The rear wheel is also shown at 510. A steering member 512, a front wheel support 514 and a handlebar frame portion 516 (also referred to simply as a handlebar, for convenience) are included in the steering structure in FIG. 25. The steering member 512 is shown in the present example as being a steering tube, and thus may be referred to for convenience as a steering tube 512. However, it will be understood that the steering member need not be hollow and therefore need not be a tube.

Figure 26:
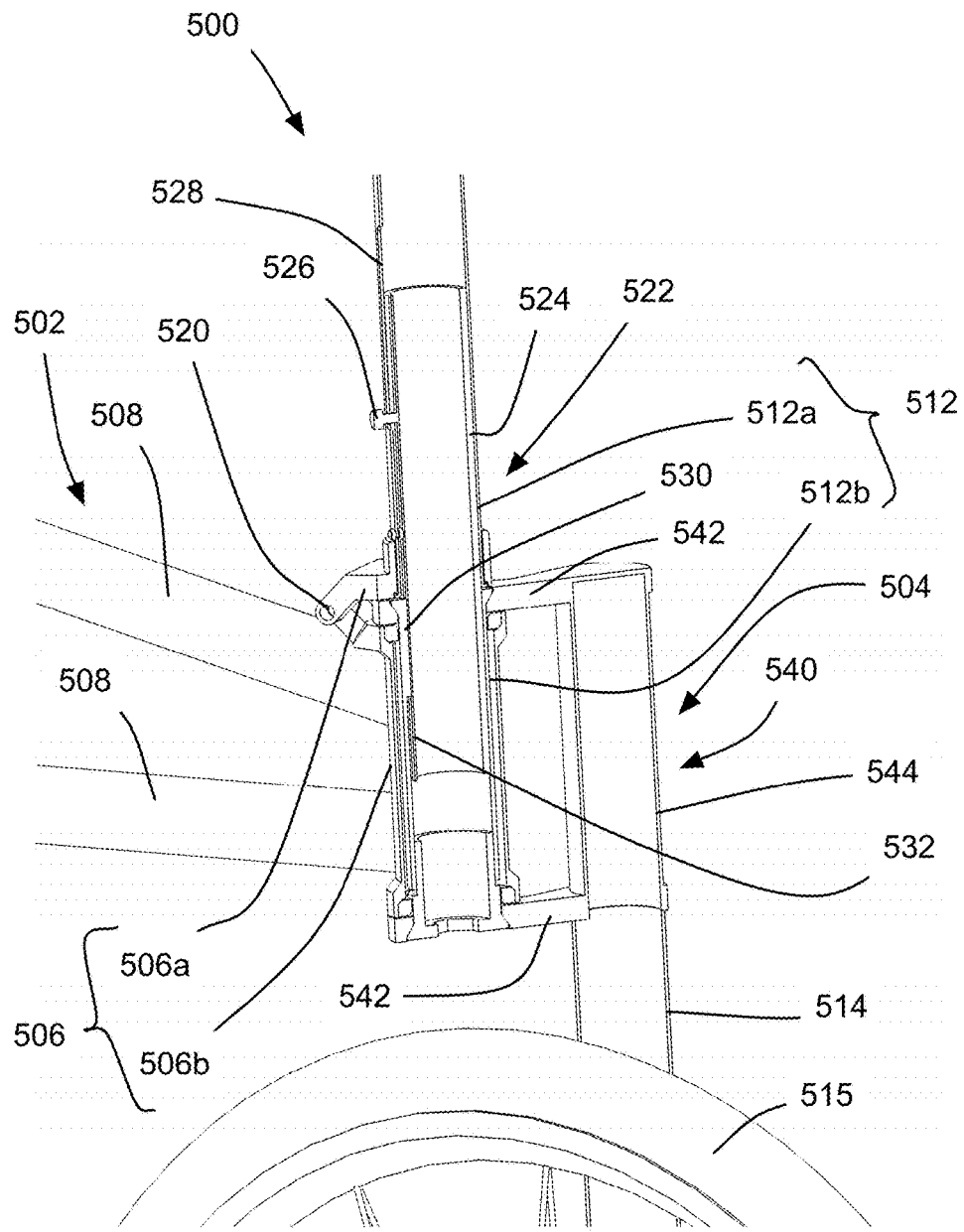
FIG. 26 is a sectional perspective view of the folding bicycle shown in FIG. 25, with the head tube in the use position.

The steering tube 512 is rotatably mounted in the head tube 506. Referring to FIG. 26, the steering tube 512 includes a first steering tube portion 512*a* and a second steering tube portion 512*b* that are removably connectable together. The first steering tube portion 512*a* has the handlebar 516 (Figure connected thereto and the second steering tube portion 512*b* has the front wheel support 514 connected thereto, which supports the front wheel shown at 515.

Figure 27:
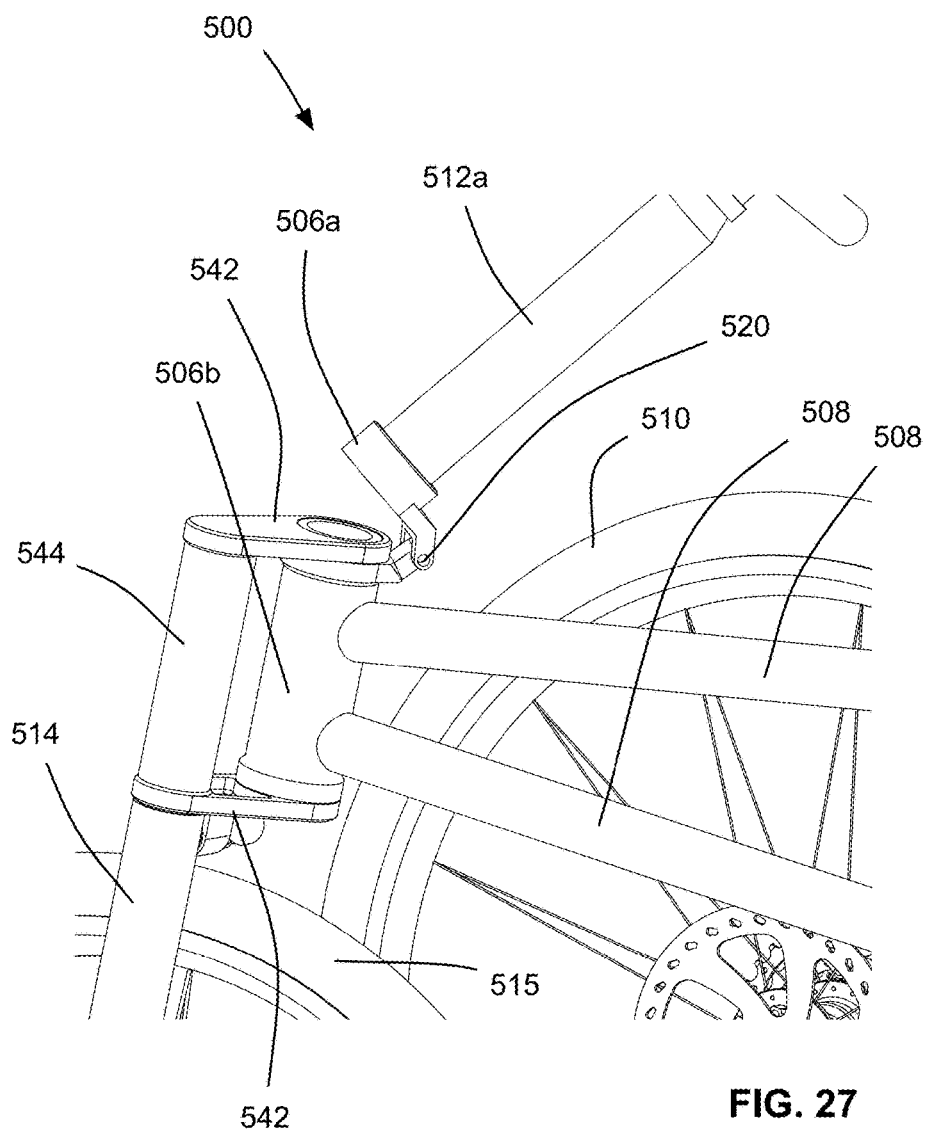
FIG. 27 is a perspective view of the folding bicycle shown in FIG. 25, with the head tube in between the use position and a stowage position.
Figure 28:
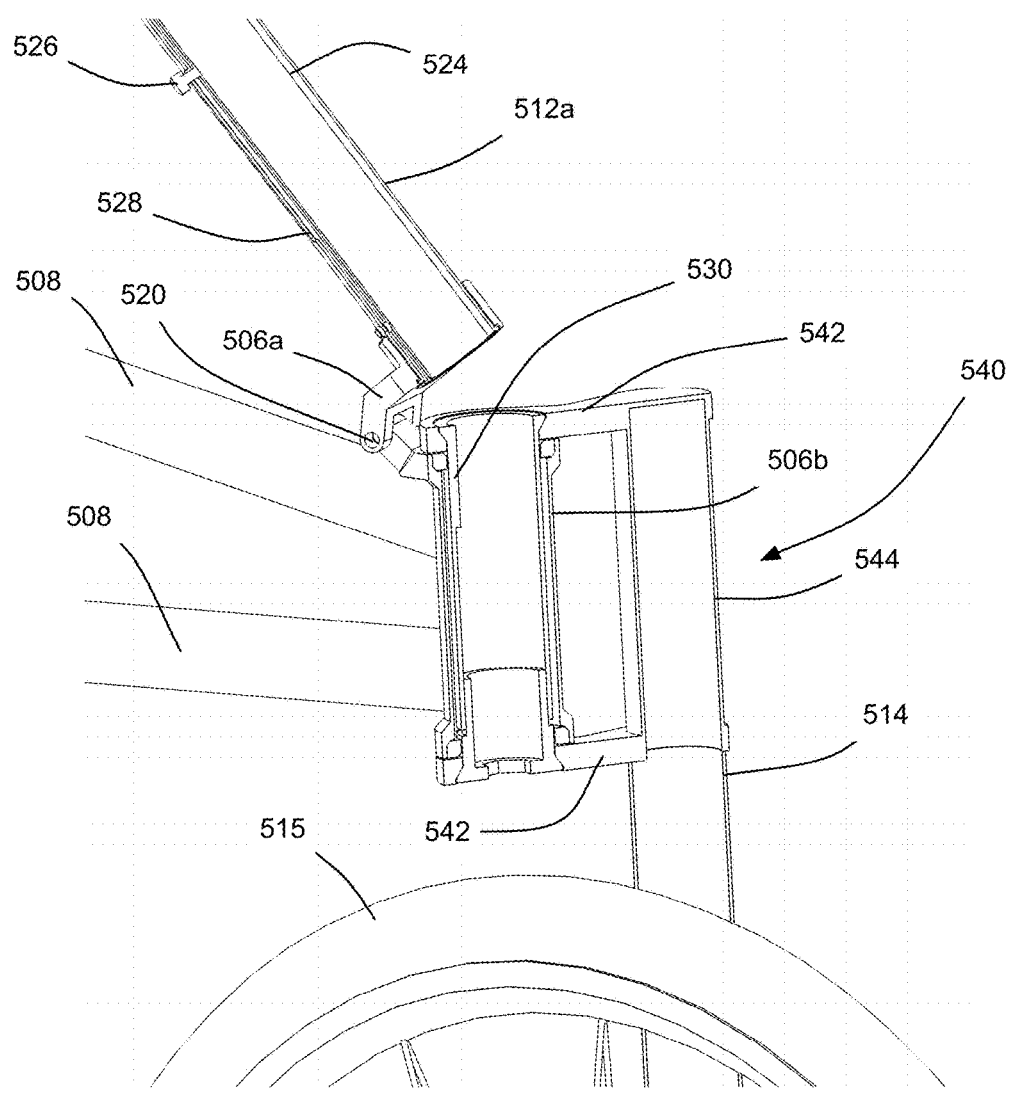
FIG. 28 is a section perspective view of the folding bicycle shown in FIG. 25, with the head tube in between the use position and the stowage position.
Figure 29:
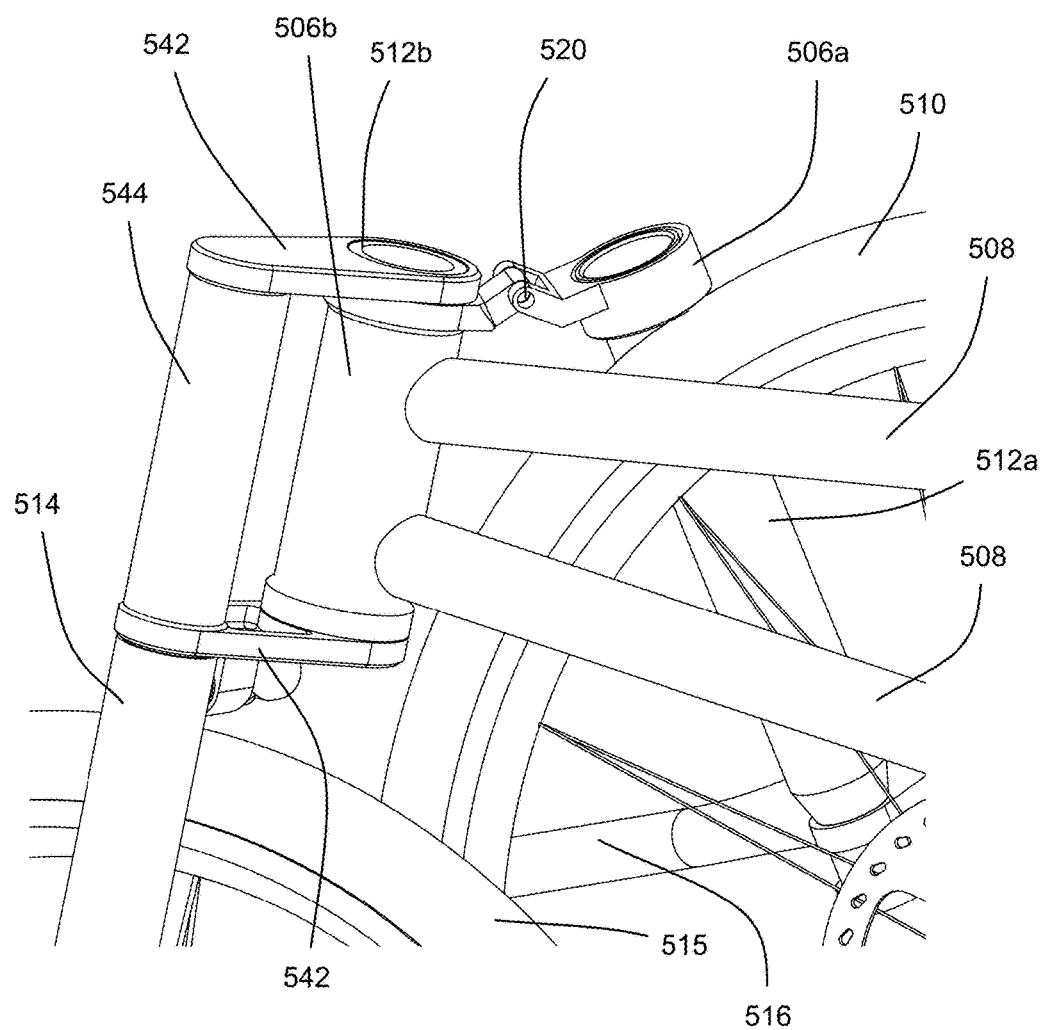
FIG. 29 is a perspective view of the folding bicycle shown in FIG. 25, with the head tube in the stowage position.
Figure 30:
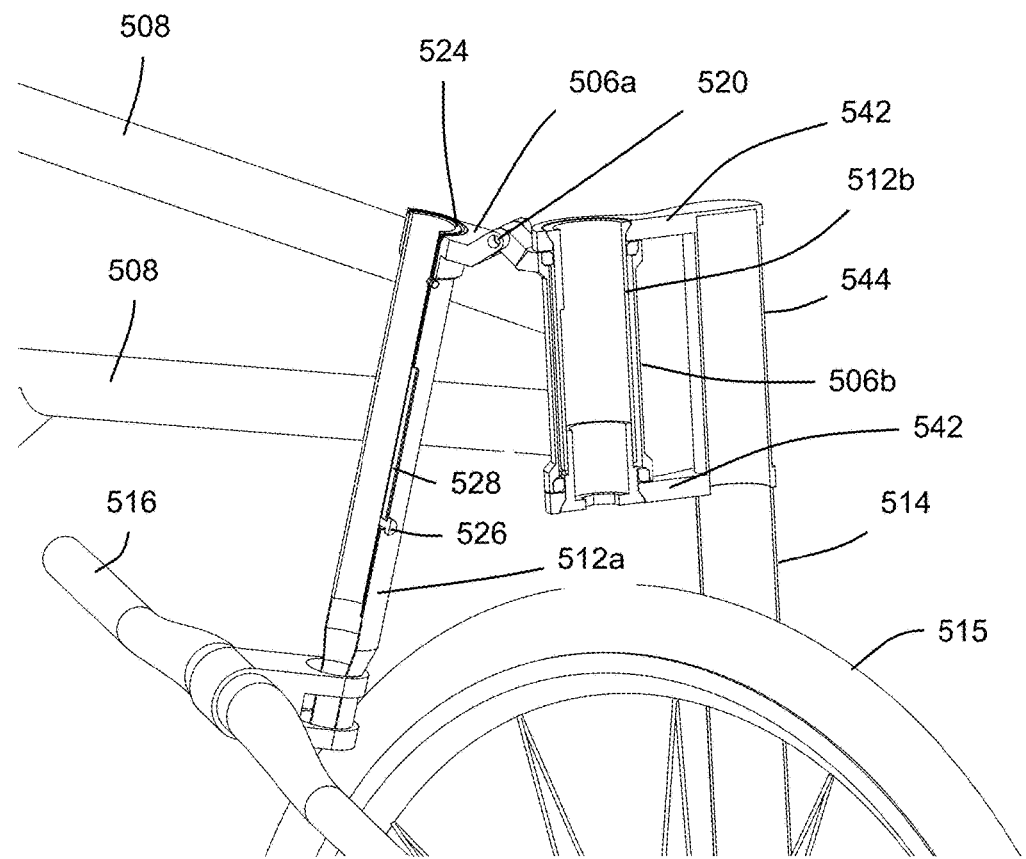
FIG. 30 is a section perspective view of the folding bicycle shown in FIG. 25, with the head tube in the stowage position.
Figure 31:
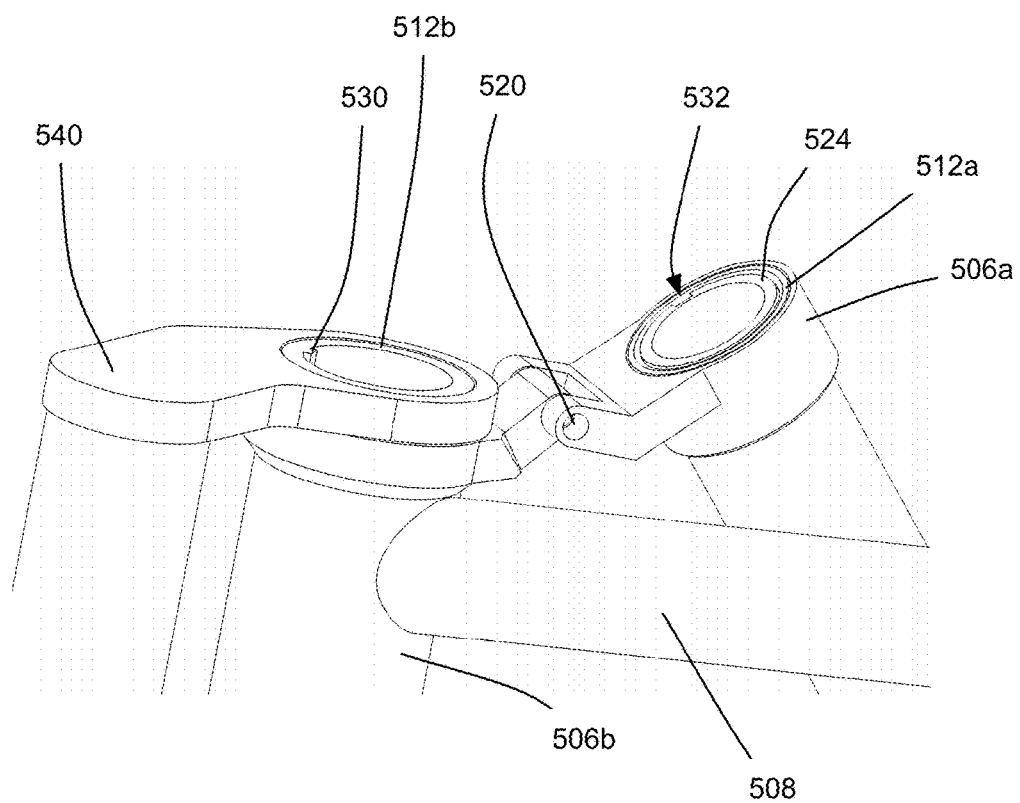
FIG. 31 is a magnified perspective view of a region of the folding bicycle so as to show a rotational coupling mechanism used to rotationally couple first and second steering member portions together.

The head tube 506 includes a first head tube portion 506*a* that holds the first steering tube portion 512*a*, and a second head tube portion 506*b* that holds the second steering tube portion 512*b*. The first head tube portion 506*a* is movable relative to the second head tube portion 506*b* between a head tube use position (FIGS. 25 and 26), in which the first head tube portion 506*a* holds the first steering tube portion 512*a* in a steering tube use position in which the first steering tube portion 512*a* is superjacent to and connectable to the second steering tube portion 512*b*, and a head tube stowage position (FIGS. 29 and 30) in which the first head tube portion 506*a* holds the first steering tube portion 512*a* in a steering tube stowage position spaced away from the second steering tube portion 512*b*. FIGS. 27 and 28 illustrate an intermediate position for the first head tube portion 506*a* during travel between the head tube use and stowage positions.

The first and second head tube portions 506*a* and 506*b* may be pivotally connected together. For example, the first and second head tube portions 506*a* and 506*b* may be connected together by way of a pin connection shown at 520.

A rotational coupling mechanism 522 is provided to rotationally fix the first and second steering tube portions 512*a* and 512*b* together. The rotational coupling mechanism 522 may have any suitable structure. For example, the rotational coupling mechanism 522 may include a slider 524 that is slidable between a slider stowage position (FIGS. 29 and 30) in which the slider 524 is positioned in the first steering tube portion 512*a* and outside of the second steering tube portion 512*b*, and a slider use position (FIGS. 25 and 26) in which the slider 524 is positioned in both the first and second steering tube portions 512*a* and is fixed rotationally to both the first and second steering tube portions 512*a* and 512*b*.

In order to rotationally fix the slider 524 to the first and second steering tube portions 512*a* and 512*b*, the slider 524 may include a first projection 526 that fits in a first slot 528 on the first steering tube portion 512*a*, and a second projection 530 may be provided on the second steering tube portion 512*b* that fits in a second slot 532 on the slider 524. The first and second slots 528 and 532 may extend generally parallel to the axis of rotation. When the slider 524 is in the slider stowage position (FIGS. 27-30), the first projection 526 engages the first slot 528, while the second projection 530 is outside of the second slot 532. When the slider 524 is in the slider use position (FIGS. 25-26), the first projection 526 engages the first slot 528, and the second projection 530 engages the second slot 532.

When the user desires to fold the bicycle 500, the user can slide the slider 524 up into the first steering tube portion 512*a* thereby permitting the user to lift the first steering tube portion 512*a* off of the second steering tube portion 512*b*, and to pivot the first head tube portion 506*a* over and down such that the first steering tube portion 512*a* sits generally alongside the second steering tube portion 512*b*. If needed, the handlebar 516 may be rotated as appropriate to bring the handlebar into good proximity with the other elements of the bicycle 500. The other portions of the bicycle 500 that can be moved to stowage positions may also be moved as appropriate.

In order to put the bicycle 500 into a use position, the user can pivot the first head tube portion 506*a* up and over so as to bring steering tube portion 512*a* superjacent to the second steering tube portion 512*b*. The handlebar 516 can be rotated in order to bring the second projection in alignment with the second steering tube portion slot 532, at which point the slider 524 can be lowered sufficiently to bring the second projection 530 and the second slot 532 into engagement, thereby rendering the first and second steering tube portions 512*a* and 512*b* connected rotationally. When the first and second projections 526 and 530 are in the first and second slots 528 and 532, the steering tubes have a selected angular alignment with respect to one another, such that the handlebar 516 may be generally parallel to the axis of rotation of the front wheel as is typical of handlebars on bicycles. The other portions of the bicycle 500 that can be moved to use positions may also be moved as appropriate.

A steering tube extension is shown at 540 (also, more broadly referred to as a steering member extension) and connects the steering tube 512 to the front wheel support 514. The steering tube extension 540 includes first and second extension arms 542 that extend from the top and bottom of the second steering tube portion 512*b* respectively, and an offset tube 544 that connects the free ends of the first and second extension arms 542. The front wheel support 514 may be pivotally and translationally connected to the steering tube extension 540 by means of a connection that is similar to the connection 32 between the front wheel support 12*c* and the frame portion 12*a* in FIG. 1*a*.

By permitting the head tube 506 to be divided into first and second portions 506*a* and 506*b*, the height of the front end of the bicycle 500 may be lower in the folded position, than it would be if the head tube 506 were not divided into first and second portions.

Furthermore, by disconnecting the first and second portions 512*a* and 512*b* of the steering member 512, the first steering member 512*a* can be put into its stowage position prior to folding of the front wheel 515, because the front wheel 515 can be turned as needed in order to be folded to its stowage (i.e. folded) position. By contrast, with some folding bicycles, it is important to keep the handlebar in the use position until the front wheel is folded. Then after folding of the front wheel, the handlebar can be moved to its stowage position. This is because, in such prior art bicycles, the handlebar remains rotationally connected to the front wheel whether the handlebar is folded or not. As a result, if the handlebar is already in its stowage position and then the front wheel is turned as needed for folding, the handlebar may inadvertently be caused to collide with the rear wheel causing damage, or the rear wheel may obstruct the necessary movement of the handlebar to accommodate the turning of the front wheel. Furthermore, the handlebar and the hinge connecting the two portions of the steering tube in some prior art bicycles are at risk of damage during any lateral crushing forces on the bicycle. However, because the handlebar 516 in the present embodiment is not rotationally connected to the second steering tube portion 512, this risk is significantly reduced.

As described above, the steering member portions 512*a* and 512*b* are tubular and have the slider 524 therein. However, it will be understood that any other suitable rotational coupling mechanism may be provided, such as, for example, teeth provided on the mutually engaging ends of the first and second steering member portions 512*a* and 512b, that mesh together when the member portions are engaged with one another. In such an alternative, the steering member portions 512a and 512b need not be tubular.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A compactable bicycle, comprising:
a base frame portion, wherein the base frame portion includes a seat tube and a head tube, at least one connecting tube that connects the seat tube and the head tube and a rear frame portion which has a rear wheel mounted thereto for engagement with a ground surface for supporting the compactable bicycle thereon; and
a steering structure, including a steering member rotatably mounted in the head tube, a handlebar, and a front wheel support having a front wheel connected thereto for engagement with the ground surface for supporting the compactable bicycle thereon,
wherein the steering member includes a first steering member portion and a second steering member portion that are removably connectable together, wherein the first steering member portion has the handlebar connected thereto and the second steering member portion has the front wheel support connected thereto,
wherein the head tube includes a first head tube portion that holds the first steering member portion, and a second head tube portion that holds the second steering member portion, wherein the first head tube portion is movable relative to the second head tube portion between a head tube use position in which the first head tube portion holds the first steering member portion in a steering member use position in which the first steering member portion is superjacent to and connectable to the second steering member portion, and a head tube stowage position in which the first head tube portion holds the first steering member portion in a steering member stowage position spaced away from the second steering member portion.

2. A compactable bicycle as claimed in claim 1, wherein, when the bicycle is standing upright and the head tube is in the head tube stowage position, a highest point on the second head tube portion, is not higher than a highest point on the first head tube portion.

3. A compactable bicycle as claimed in claim 1, wherein the first and second head tube portions are pivotably connected together.

4. A compactable bicycle as claimed in claim 1, wherein the first and second steering member portions are tubular and when the first steering member portion is in the use position the first steering member portion is connectable to the second steering member portion by a rotational coupling mechanism.

5. A compactable bicycle as claimed in claim 4, wherein the rotational coupling mechanism includes a slider that is slidable within the first and second steering member portions.

6. A compactable bicycle as claimed in claim 5, wherein the slider is slidable within a first steering member portion slot in the first steering member portion and within a second steering member portion slot in the second steering member portion such that, when the first and second steering member portion slots are both engaged by the slider, the first and second steering members have a selected angular alignment with respect to one another.

7. A compactable bicycle as claimed in claim 1, wherein the front wheel support has a front wheel support connecting end axis and a first end face that extends in a first end face plane that is generally normal to the front wheel support connecting end axis, and the steering member has a steering member connecting end axis and a second end face that extends in a second end face plane that is generally normal to the steering member connecting end axis,
wherein the front wheel support is movable between a use position in which the front wheel support connecting end axis is aligned with the steering member connecting end axis, in which the first and second end faces abut one another, and in which the front wheel is engageable with a ground surface for supporting the compactable bicycle thereon, and a folded position in which the front wheel support connecting end axis is unaligned with the steering member connecting end axis, in which the first and second end faces are spaced from one another.

* * * * *